United States Patent
Wang et al.

(10) Patent No.: US 11,818,737 B2
(45) Date of Patent: Nov. 14, 2023

(54) METHODS AND APPARATUSES FOR DATA RETRANSMISSION USING SIDELINK DIVERSITY

(71) Applicant: QUALCOMM Incorporated, San Diego, CA (US)

(72) Inventors: Hua Wang, Basking Ridge, NJ (US); Piyush Gupta, Bridgewater, NJ (US); Junyi Li, Chester, NJ (US); Xiaoxia Zhang, San Diego, CA (US); Jing Sun, San Diego, CA (US); Yisheng Xue, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 16/719,471

(22) Filed: Dec. 18, 2019

(65) Prior Publication Data

US 2021/0195573 A1 Jun. 24, 2021

(51) Int. Cl.
*H04W 72/51* (2023.01)
*H04L 5/00* (2006.01)
(Continued)

(52) U.S. Cl.
CPC .......... *H04W 72/51* (2023.01); *H04L 5/0037* (2013.01); *H04L 5/0055* (2013.01); *H04W 72/30* (2023.01); *H04W 88/04* (2013.01)

(58) Field of Classification Search
CPC ... H04W 88/04; H04W 4/40; H04W 72/1289; H04W 72/14; H04W 72/02; H04W 28/0268
See application file for complete search history.

(56) References Cited

U.S. PATENT DOCUMENTS

2014/0241254 A1   8/2014  Kaur et al.
2015/0382336 A1*  12/2015  Zhang ................. H04L 1/1812
                                              370/329
(Continued)

FOREIGN PATENT DOCUMENTS

WO    2018203669 A1    11/2018
WO    2019027242 A1    2/2019
WO    2019156505 A1    8/2019

OTHER PUBLICATIONS

Energy-Efficient Power Control Scheme for Device-to-Device Communications, Yanli Xu, Wireless Personal Communications (Year: 2017).*

(Continued)

*Primary Examiner* — Yu-Wen Chang
(74) *Attorney, Agent, or Firm* — Qualcomm Incorporated/Seyfarth Shaw LLP

(57) ABSTRACT

Methods, systems, and devices for wireless communication are described. Generally, the described techniques provide for forward/retransmitting a data transmission to a target UE through a helper UE. A helper UE may receive a data transmission from a network node, determining whether the received data transmission is intended for a target UE or for the helper UE itself, based on a control message, and retransmitting the data transmission to the target UE upon determining that the data transmission is intended for the target UE. A network node such as a base station may transmit a control message to at least a help UE, the control message comprising an indicator of whether a data transmission is intended for the helper UE or a target UE and transmit the data transmission to at least the helper UE and the target UE.

25 Claims, 17 Drawing Sheets

(51) Int. Cl.
*H04W 88/04* (2009.01)
*H04W 72/30* (2023.01)

(56) References Cited

U.S. PATENT DOCUMENTS

| | | | |
|---|---|---|---|
| 2016/0013903 A1* | 1/2016 | Kim | H04L 1/00 370/329 |
| 2016/0044619 A1* | 2/2016 | Ryu | H04W 72/0446 370/350 |
| 2018/0035435 A1* | 2/2018 | Gupta | H04L 5/0092 |
| 2018/0084542 A1* | 3/2018 | Fujishiro | H04L 1/0026 |
| 2018/0176892 A1* | 6/2018 | Kim | H04W 52/386 |
| 2018/0206173 A1* | 7/2018 | Virtej | H04W 40/02 |
| 2018/0213486 A1* | 7/2018 | Yoo | H04W 52/248 |
| 2018/0234968 A1* | 8/2018 | Sun | H04W 72/042 |
| 2018/0270033 A1* | 9/2018 | Dou | H04W 72/042 |
| 2018/0324882 A1* | 11/2018 | Gulati | H04W 72/23 |
| 2019/0037600 A1* | 1/2019 | Urabayashi | H04W 16/14 |
| 2019/0280761 A1* | 9/2019 | Hu | H04B 7/15557 |
| 2020/0107170 A1* | 4/2020 | Chen | H04L 5/0055 |
| 2020/0137782 A1* | 4/2020 | Su | H04L 5/00 |
| 2020/0146044 A1* | 5/2020 | Maaref | H04W 72/1289 |
| 2020/0154350 A1* | 5/2020 | Dao | H04W 36/0009 |
| 2020/0163155 A1 | 5/2020 | Lee et al. | |
| 2020/0275474 A1* | 8/2020 | Chen | H04L 1/1848 |
| 2021/0028891 A1* | 1/2021 | Zhou | H04L 1/1854 |
| 2021/0067444 A1* | 3/2021 | Zhu | H04L 45/74 |
| 2021/0127396 A1* | 4/2021 | Su | H04W 72/1289 |
| 2021/0144641 A1* | 5/2021 | Sun | H04W 52/0216 |
| 2021/0153176 A1* | 5/2021 | Lee | H04W 4/40 |
| 2021/0185715 A1* | 6/2021 | Shen | H04L 5/001 |
| 2021/0243790 A1* | 8/2021 | Ji | H04L 1/1896 |
| 2021/0258988 A1* | 8/2021 | Balakrishnan | H04W 72/1263 |

OTHER PUBLICATIONS

International Search Report and Written Opinion—PCT/US2020/065637—ISA/EPO—dated Mar. 23, 2021.

* cited by examiner

METHODS AND APPARATUSES FOR DATA RETRANSMISSION USING SIDELINK DIVERSITY

FIELD OF TECHNOLOGY

The present disclosure relates generally to wireless communications and more specifically to data retransmission using sidelink diversity.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, such as industrial interne of things (I-IoT) applications, various UEs may be configured to communicate with each other over sidelink channels. These sidelink communications may enhance the wireless systems via reduced latency, multi-path diversity, coverage extension, battery-life improvement, location enhancement, and infrastructure-less communication. In some cases, each of the UEs may use sidelink channel diversity to retransmit a received data transmission to a target UE. This is to help a base station transmit the data transmission intended for the target UE when the direct downlink connection between the base station and the target UE is broken or degraded beyond a predetermined point.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some situations, a direct communication link between a target UE and a base station may not be optimal or usable for various reasons. A helper UE group may be formed to help forward the data from the base station to the target UE. In some cases, a helper UE may determine whether a received data transmission is intended for itself or a target UE and may use a sidelink channel diversity to retransmit the received data transmission to a target UE, when it determines that the data transmission is for the target UE. This is to help a base station transmit the data transmission intended for the target UE when the direct downlink connection between the base station and the target UE is broken or degraded beyond a predetermined point.

In an aspect of the disclosure, a method, a computer-readable medium, and an apparatus are provided. The apparatus is configured to determine whether a received data transmission is intended for itself or a target UE and to retransmit the received data transmission to a target UE using the sidelink channel diversity, when it determines that the data transmission is for the target UE.

In another aspect of the disclosure, a method, a computer-readable medium, and an apparatus are provided. The apparatus is configured to transmit a control message to a helper UE to allocate sideline resources for data retransmission by the helper UE, to transmit a data transmission to be forwarded to a target UE and to optionally trigger the data retransmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

In some wireless communications systems, such as industrial interne of things (I-Iot) applications and vehicle to everything (V2X) systems, various user equipments (UEs) may be configured to communicate with each other over sidelink channels. These sidelink communications may enhance the wireless systems via reduced latency, multi-path diversity, coverage extension, battery-life improvement, location enhancement, and infrastructure-less communication. A communication link may be established between a UE and a base station, but the link quality may be degraded due to fading or blockage. Another UE may be utilized to help the affected UE by communicating with the affected UE using a sidelink channel. In some cases, the UEs may perform various measurements to determine sidelink channel quality and diversity and other information such as UE state information to help the BS determine a helper UE group to help with the communications with the affected UE, which is also termed target UE in this disclosure. Once the helper UE group is determined, In some cases, when a link between a base station fails or degrades due to fading, blocking, etc., then the base station may leverage one or more helper UEs from a helper UE groups to communicate data to and receive data from an affected UE (e.g., targeted UE) through the helper UE by leveraging a sidelink channel between the affected UE and the helper UE. From the perspective of a helper UE, the helper UE may determine whether a data transmission is intended for itself or a target UE, what sidelink resource to use for forwarding the data transmission to the target UE, and whether to decode at least part of the data transmission before retransmitting the data transmission to the target UE, etc.

Techniques are provided herein for a network node (a base station or programmable logic control (PLC) node) upon determine a helper UE group, to allocate sidelink resources to a helper UE, transmit a data transmission to the helper UE, and optionally send a trigger to the help UE to trigger the helper UE to forward the received data transmission to the target UE.

Particular aspects of the subject matter described herein may be implemented to realize one or more advantages. The described techniques may support improvements in the sidelink communication framework, decreasing signaling overhead, and improving reliability, among other advantages. As such, supported techniques may include improved network operations and, in some example aspects, may promote network efficiencies, among other benefits.

Aspects of the disclosure are initially described in the context of wireless communications systems. Aspects of the disclosure are further described with respect to wireless communications systems and a process flow diagram. Aspects of the disclosure are further illustrated by and described with reference to apparatus diagrams, system diagrams, and flowcharts that relate to determining a helper UE group.

Figure 1:
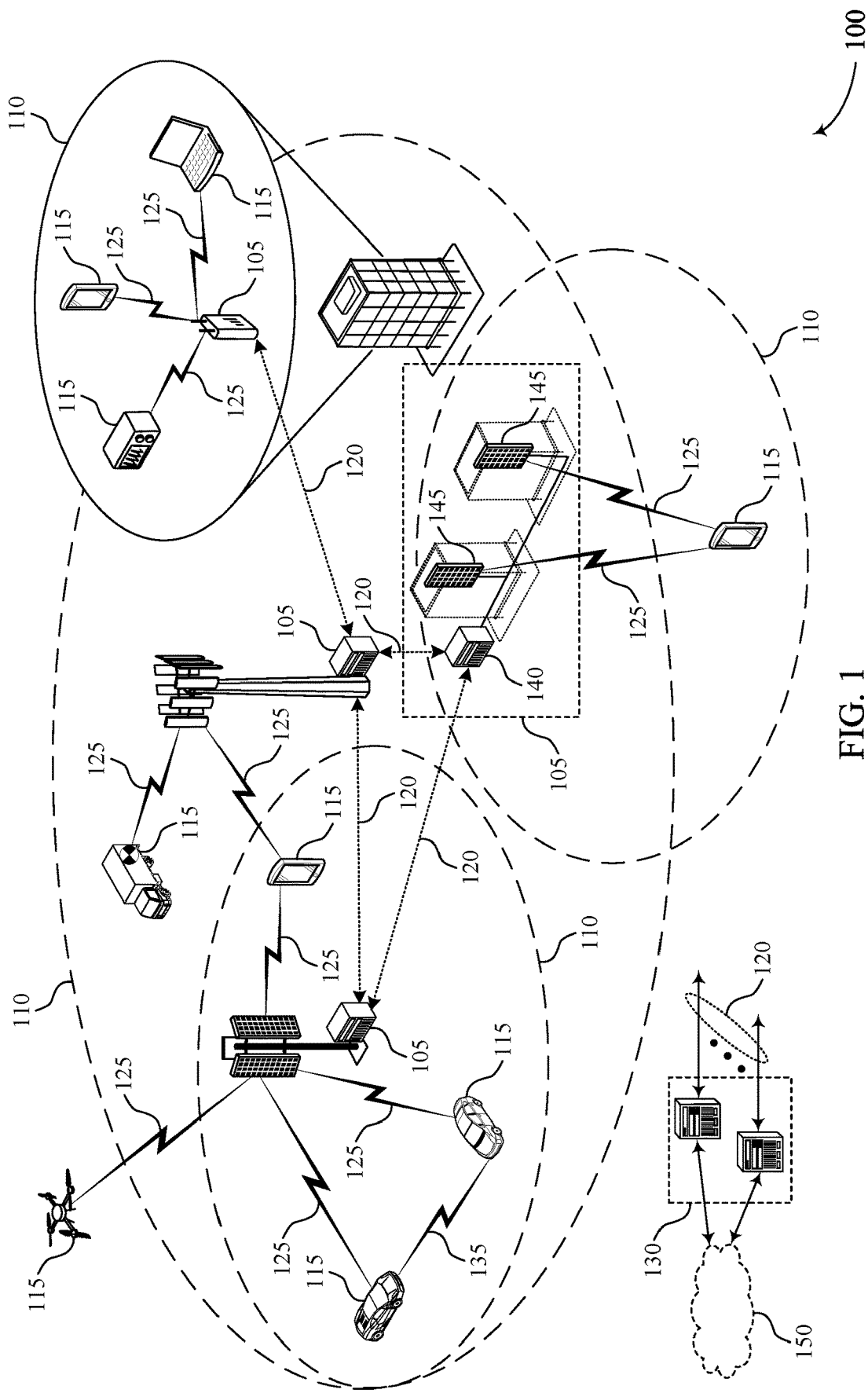
FIG. 1 illustrates an example of a system for wireless communications in accordance with aspects of the present disclosure.

FIG. 1 illustrates an example of a wireless communications system 100 in accordance with aspects of the present disclosure. The wireless communications system 100 may include one or more base stations 105, one or more UEs 115, and a core network 130. In some example aspect, the wireless communications system 100 may be a Long Term Evolution (LTE) network, an LTE-Advanced (LTE-A) network, an LTE-A Pro network, or a New Radio (NR) network. In some example aspects, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some example aspects, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some example aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some example aspects (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and In some example aspects the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some example aspects, the wireless communications system 100 may include base stations 105 or UEs 115 that support simultaneous communications via carriers associated with multiple carrier bandwidths. In some example aspects, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some example aspects, a UE 115 may be configured with multiple BWPs. In some example aspects, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some example aspects, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some example aspects, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some example aspects, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some example aspects, a carrier may support multiple cells, and different cells may be configured according to different protocol types (e.g., MTC, narrowband IoT (NB-IoT), enhanced mobile broadband (eMBB)) that may provide access for different types of devices.

In some example aspects, a base station 105 may be movable and therefore provide communication coverage for a moving geographic coverage area 110. In some example aspects, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, In some example aspects, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some example aspects, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some example aspects, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some example aspects, a UE 115 may also be able to communicate directly with other UEs 115 over a device-todevice (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some example aspects, groups of the UEs 115 communicating via D2D communications may utilize a one-to-many (1:M) system in which each UE 115 transmits to every other UE 115 in the group. In some example aspects, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some example aspects, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some example aspects, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some example aspects, the wireless communications system 100 may support millimeter wave (mmW) communications between the UEs 115 and the base stations 105, and EHF antennas of the respective devices may be smaller and more closely spaced than UHF antennas. In some example aspects, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some example aspects, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some example aspects, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some example aspects, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some example aspects, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some example aspects, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some example aspects, a device may support same-slot HARQ feedback, where the device may provide HARQ feedback in a specific slot for data received in a previous symbol in the slot. In other cases, the device may provide HARQ feedback in a subsequent slot, or according to some other time interval.

UEs 115 may be configured to communicate with each other over sidelink channels. These sidelink communications may enhance the wireless systems via reduced latency, multi-path diversity, coverage extension, battery-life improvement, location enhancement, and infrastructure-less communication. For example, a communication link may be established between a UE 115 and a base station 105. However, the link quality may be degraded due to fading or blockage. Another UE 115 may be utilized to help the affected UE 115 by communicating with the affected UE 115 using a sidelink channel. In some cases, the UEs 115 may perform various measurements to determine sidelink channel quality, channel throughput, and other metrics to determine whether to utilize a sidelink channel.

Another UE may be utilized to help the affected UE by communicating with the affected UE using a sidelink channel. In some cases, the UEs may perform various measurements to determine sidelink channel correlation and diversity and other information such as UE state information to help the associated base station 105 determine a helper UE group.

In some cases, the UE 115 may determine whether a data transmission is intended for itself or a target UE, what sidelink resource to use for forwarding the data transmission to the target UE, and whether to decode at least part of the data transmission before retransmitting the data transmission to the target UE, etc.

In some cases, the base station 105, upon determine a helper UE group, may transmit a control message to the helper UE to allocate sidelink resources to the helper UE, transmit data to the target UE, and optionally send a trigger to the help UE to trigger the helper UE to forward the received data to the target UE.

Figure 2A:
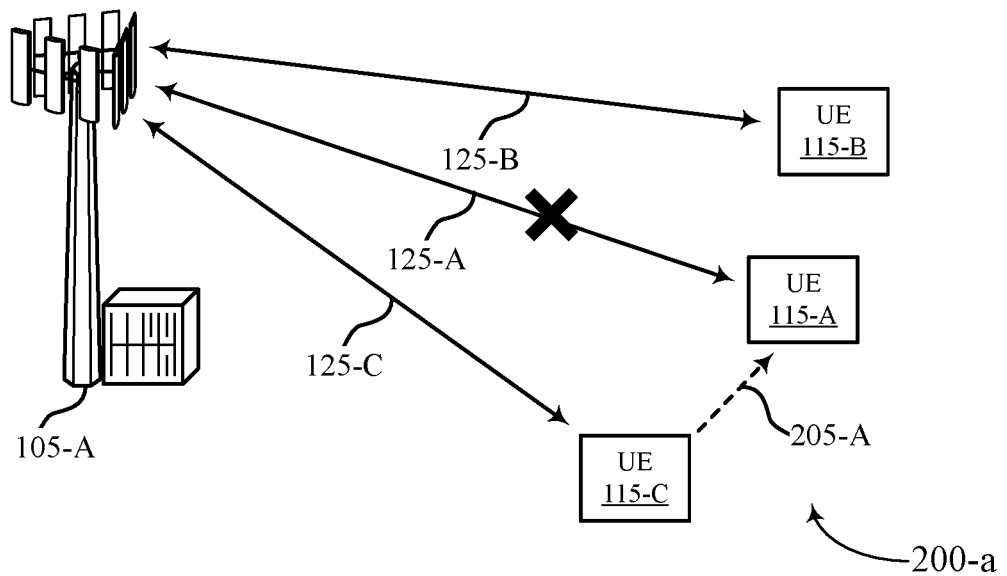
FIGS. 2A and 2B illustrate examples of wireless communications systems in accordance with aspects of the present disclosure.
Figure 2B:
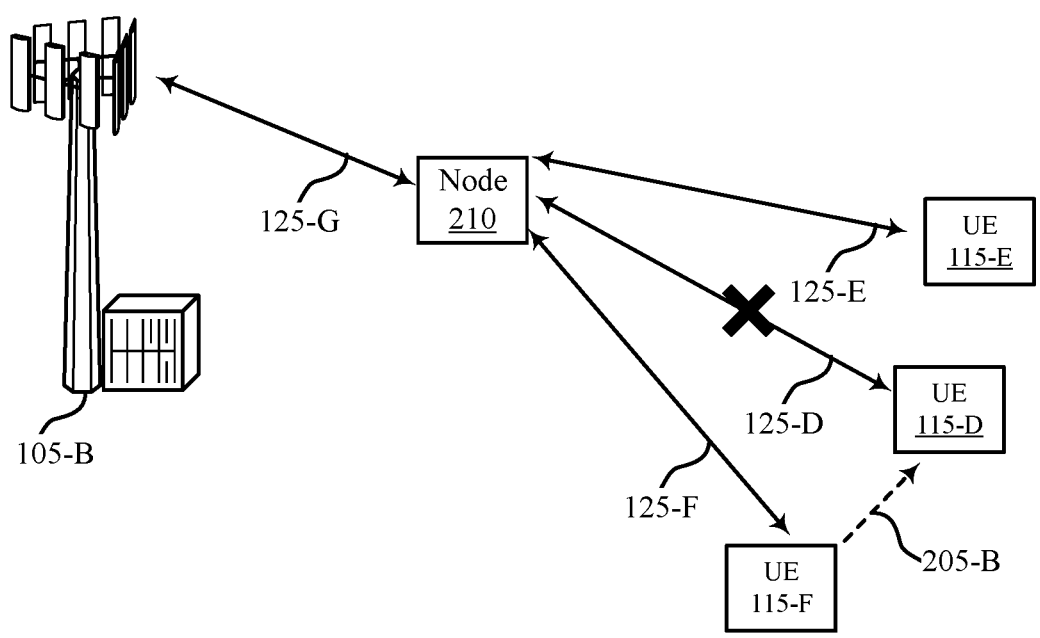

FIGS. 2A and 2B illustrates illustrate examples of wireless communications systems 200 in accordance with aspects of the present disclosure. In some example aspects, wireless communications systems 200 may implement aspects of wireless communications system 100. The wires communications systems 200 include base stations 105-a and 105-b and UEs 115, which may be examples of the corresponding devices of FIG. 1.

As illustrated in FIG. 2A, each of UE 115-a, UE 115-b, and UE 115-c may establish a respective communication link with base station 105-a. However, due to an issue such as fading or blocking, the communication link 125-a between UE 115-a and base station 105-a is degraded or is dropped. Thus, the base station 105-a may leverage sidelink channels (e.g., sidelink channel 205-a) to communicate with the UE 115-a. In FIG. 2A, the UE 115-c is helping or assisting the UE 115-a by forwarding or retransmitting data received from the base station 105-a to the UE 115-a through the sidelink 205-a.

To accomplish the goal of helping the UE 115-a, the helper UEs 115 (e.g., UE 115-b and UE 115-c) may measure the sidelinks the target UE 115-a. The UEs 115-b and 115-c may send various reports to the base station 105-a for determination of a helper group and a sidelink within the helper UE group. Since the base station 105-a configures the reporting of the UE 115-a, the base station 105-a may utilize various reports received from the helper UEs 115-b and 115-c to select the sidelink channel 205-a between the target UE 115-a and the help UE 115-c for communication with the UE 115-a. In some cases, the base station 105-a may transmit a control message to each of the UEs 115-b and 115-c, and the control message may request various reports on demand. The UEs 115-b and 115-c may report various sidelink measurements and diversity information, and UE state information, among others, to the base station 105-a. The base station 105-a may then transmit data and a relay instruction to one of the UEs 115-b and 105-c such that the UE 115-b or 115-c may retransmit the data to the UE 115-a using a sidelink channel. For example, the base station 105-a transmits the data to UE 115-c using link 125-c, and the UE 115-c relays/forwards/retransmits the data to UE 115-a using sidelink 205-a.

FIG. 2B includes base station 105-b, UE 115-d, UE 115-e, and UE 115-f as well as node 210. The node 210 may be an example of a base station 105 or UE 115, a mobile UE 115, a power line communication UE 115, a high powered UE 115, a virtual base station, etc. In one example, the node 210 may be an example of a programmable logic controller (PLC) node that may have variety of physical configurations in various deployment scenario. For example, the PLC node may be a separate physical device deployed together with or separately from the base station 105-b. The node 210 communicates with base station 105-b over communication link 125-g. Further, the node 210 communicates with the UEs 115 over respective communication links 125. However, due to an issue such as fading or blocking, the communication link 125-d between UE 115-d and the node 210 is degraded beyond a predetermined point or is dropped. Thus, the node 210 may leverage sidelink channels (e.g., sidelink channel 205) to communicate with the UE 115-a. In FIG. 2B, the UE 115-f is helping or assisting the UE 115-d by forwarding or retransmitting data received from the node 210 to the UE 115-d through the sidelink 205-b.

In some cases, the node 210 may transmit a control message to each of the UEs 115-e and 115-f, and the control message may allocate sidelink resources for the helper UE 115-f to use to forward the data transmission to the target UE 115-d. The node 210 may then transmit data and a relay instruction to one of the UEs 115-e and 105-f such that the UE 115-e or 115-f may retransmit the data to the UE 115-d using the allocate sidelink channel. For example, the node 210 transmits the data to UE 115-d using link 125-f, and the UE 115-f relays/forwards/retransmits the data to UE 115-d using the sidelink 205-b.

Figure 3:
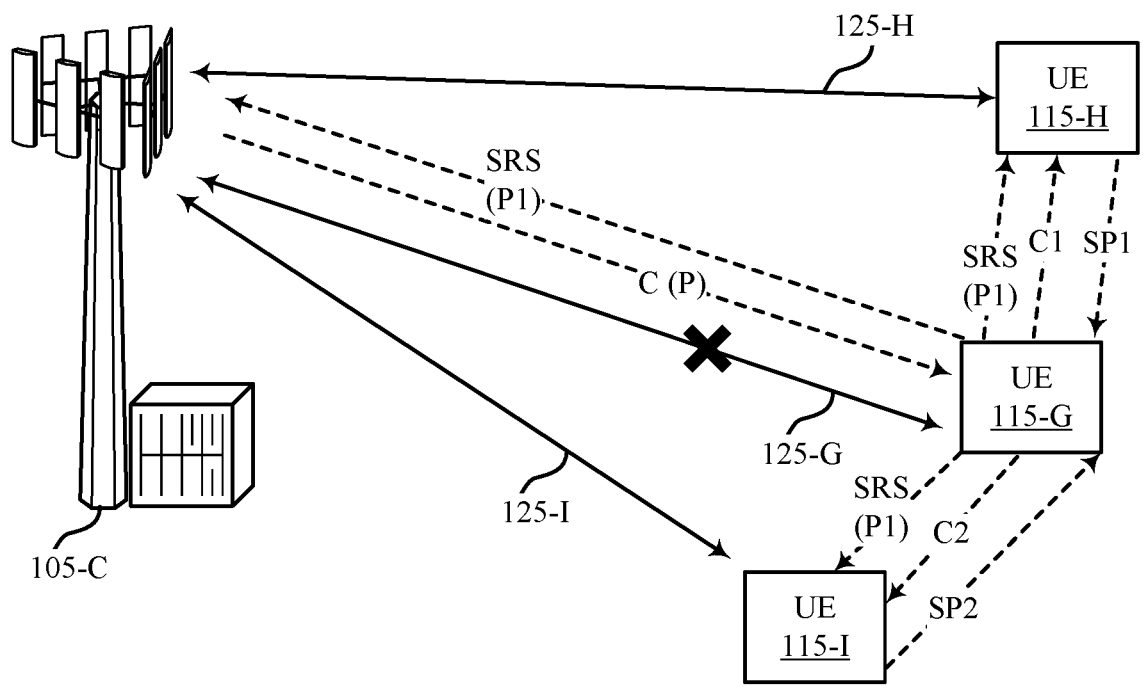
FIG. 3 illustrates an example of a wireless communications system in accordance with aspects of the present disclosure.

FIG. 3 illustrates an example of a wireless communications system 300 in accordance with aspects of the present disclosure. In some example aspects, wireless communications system 300 may implement aspects of wireless communications system 100. The wires communications systems 300 include base stations 105-c and UEs 115, which may be examples of the corresponding devices of FIGS. 1 and 2. The base station 105-c may establish respective communication links 125 with the UEs 115.

Due to an issue such as blocking or fading, the communication link 125-g between the base station 105-c and the UE 115-g may be degraded, fail, or be dropped. Accordingly, the base station 105-c may utilize techniques described herein to identify a sidelink for communication with the UE 115-g. The base station 105-c may transmit a control message to the UEs 115-h and 115-i, and the control message may indicate a sidelink resource allocation for the helper UEs 115-h and 115-i to retransmit / forward the received data to the target UE 115-g.

In some example aspect, a UE 115 may determine sidelink quality with another UE 115 by measuring the signal transmission power on the sidelink associated with the other UE 115. For example, the UE 115-g may transmit a sounding reference signal (SRS) using a power P1, and the UE 115-h and UE115-i may receive the SRS. The base station 105-c and the UEs 115-h and 115-i may measure the received SRS power of the transmitted SRS. For example, UE 115-i may receive the SRS from UE 115-g at power P1*C2, where C2 is the channel from the UE 115-g to the UE 115-i. UE 115-i is configured with a sidelink channel power of SP2. Thus, UE 115-i may calculate P1*C2*SP2, where C2*SP2 is the received power of sidelink data sent from UE 115-i to UE 115-g. Similarly, the UE 115-h may receive the SRS from UE 115-g at power P1*C1, where C1 is the channel from the UE 115-g to the UE 115-h. UE 115-h is configured with a sidelink channel power of SP1. Thus, UE 115-h may calculate P1*C1*SP1, where C1*SP1 is the received power of sidelink data sent from UE 115-h to UE 115-g.

In some example aspect, a base station 105 may determine downlink channel quality for resource allocation by measuring the signal transmission power on the downlink with the UE 115. For example, the base station 105-c may be configured with a downlink power P and may calculate P1*C*P, where C is the downlink channel from the base station 105-c to the UE 115-g. Further, C*P may correspond to the received power of downlink data from the base station 105-c to UE 115-g. The base station 105-c may use or determine (e.g. set) a threshold T based on P1*C*P. For example, T may be 5 dB above P1*C*P. When other UEs 115 sidelink transmission power times its received SRS power (e.g., P1*C1*SP1 or P1*C2*SP2) satisfies (e.g., is greater than or equal to) the threshold, then that UE 115 may be a member of the helper UE group that may potentially assist the UE 115-g and hence may transmit a measurement report to base station 105-c indicating the that threshold T is satisfied. For example, if the UE 115-i determines that P1*C2*SP2 is greater than the threshold T, then the base station 105-c may determine that the UE 115-i may be a member of the helper UE group that may assist the UE 115-g via sidelink communications. If a UE 115 determines that P1*C2*SP2 does not satisfy the threshold, the UE 115 may not be a member of the helper UE group and thus may skip transmitting the measurement report.

In some cases, the base station 105-c may transmit the control message via radio resource control (RRC) messaging to the UEs 115-i and the UE 115-h. In some cases, the RRC message may also indicate the resources allocations for the UE 115-i and the UE 115-h to forward received data to the target UE 115-g.

Figure 4:
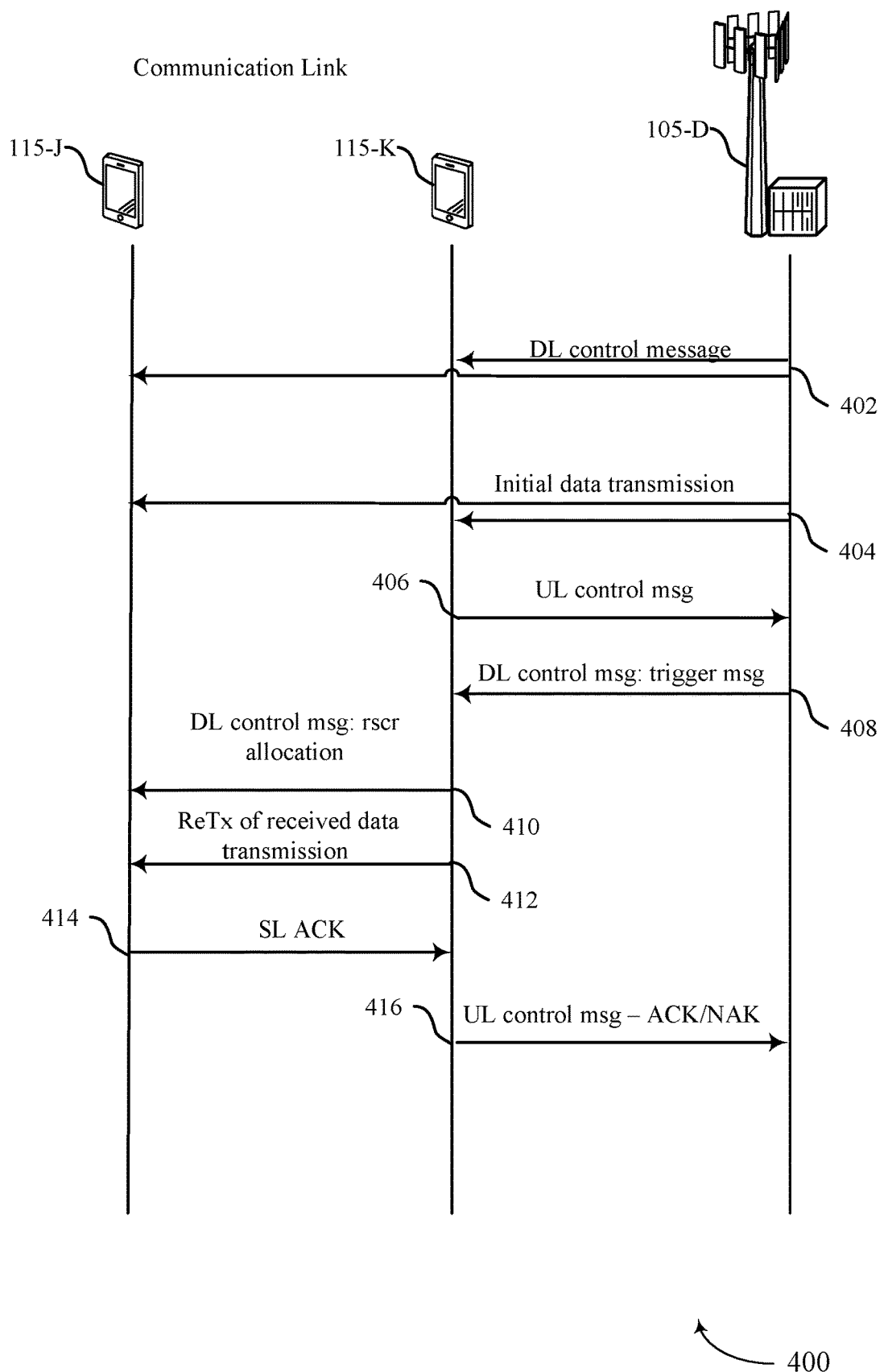
FIG. 4 illustrates an example of a flow diagram in accordance with aspects of the present disclosure.

FIG. 4 illustrates an example of a process flow diagram 400 in accordance with aspects of the present disclosure. In some example aspects, process flow diagram 400 may implement aspects of wireless communications system 100. Process flow diagram 400 includes UE 115-j, UE 115-k, and base station 105-d, which may be examples of the corresponding devices of FIGS. 1 through 3. The base station 105-d may establish a communication link with the UE 115-j and UE 115-k. In an alternative implementation, in place of the base station 105-d may be a PLC node as described in FIGS. 1 through 3.

At 402, the base station 105-d transmits a control message to both the UE 115-j and UE 115-k while the UE 105-j may be the target UE and the UE 105-k may be a helper UE. In one example aspect, the control message may indicate whether the data transmission is for the UE or for the target UE via a downlink control information (DCI) included in a PDCCH message or via a map of a set of UEs, the map capable of uniquely identifies the target UE based in part on a data transmission. In one example aspect, the control message such a PDCCH message may also indicate a sidelink resource allocation for retransmission of the data transmission to the target UE. In one example aspect, the control message may also indicate whether the data transmission is to be at least partially decoded if the data transmission in intended for the target UE.

At 404, the base station 105-d transmits a first data transmission to both target UE 115-j and the helper UE 115-k, and maybe some other UEs (not shown) as well. This may be termed first data transmission or initial data transmission, in reference to a later retransmission of the data transmission to the target UE by a helper UE. The first data transmission may optionally include some control information such as an indication of whether the helper UE 115-k should process the data transmission intended for the target UE 115-j.

At 406, the helper UE 115-k may send an uplink control message to indicate at least whether the first data transmission has been successfully received. In one example aspect, the helper UE 115-k sends the ACK/NAK after it has successfully processed at least part of the first/initial data transmission.

At 408, in an optional step, the base station 105-d may transmit another control message to the helper UE 115-k to instruct the helper UE 115-k to commence retransmission/forwarding of the first data transmission to the target UE 115-j. This control message may be called a trigger message to trigger the helper UE 115-j to forward the first data transmission to the target UE 115-j. In one example aspect, the base station 105-d sends the trigger message after receiving an ACK from the helper UE 115-k and after failing to receiving an ACK from the target UE 115-j.

At 410, the helper UE 115-k, in an alternative step, may send a control message to the target UE 115-j on a sidelink channel. The control message may indicate a resource allocation on the sidelink for the helper UE 115-k to forward the first data transmission and for the target UE 115-j to receive the forwarded first data transmission.

At 412, the helper UE 115-k may forward the received first/initial data transmission to the target UE 115-j using the allocated sidelink resource. The data retransmission may be an exact copy of the first data transmission or may include some extra information, after the helper UE 115-k has successfully processed at least part of the first/initial data transmission.

At 414, the target UE 115-j may transmit a sidelink (DL) control message to the helper UE 115-k to acknowledge a successful reception of the forwarded data or failure to receive the forwarded data transmission. In one example aspect, the control message may be carried on a sidelink channel that has been allocated in the control message transmitted from the helper UE 115-*k* to the target UE 115-*j* at 410.

At 416, the helper UE may forward the received ACK/NACK message to the base station 105-*d* in an uplink control message. In an alternative aspect, the helper UE may generate and send a new ACK/NACK to the base station 105-*d*, based on the received ACK/NACK from the target UE 115-*j*.

The operations shown in FIG. 4 are for illustration only. Note that the operation steps shown in FIG. 4 may be merged, or removed and new steps may be added without deviating from the spirit of the present disclosure.

FIGS. 5*a* through 5*d* illustrate example timelines of communications between a network node and a helper UE in accordance with aspects of the present disclosure. In one example aspect, the network is one of a base station or a PLC node. Each of the timelines of FIGS. 5*a* through FIGS. 5*d* is divided into two parts, 1$^{st}$ transmission and retransmission, referring to the initial data transmission from the base station to a helper UE and the retransmission/forwarding/relay of the initial data transmission from the helper UE to the target UE.

Figure 5A:
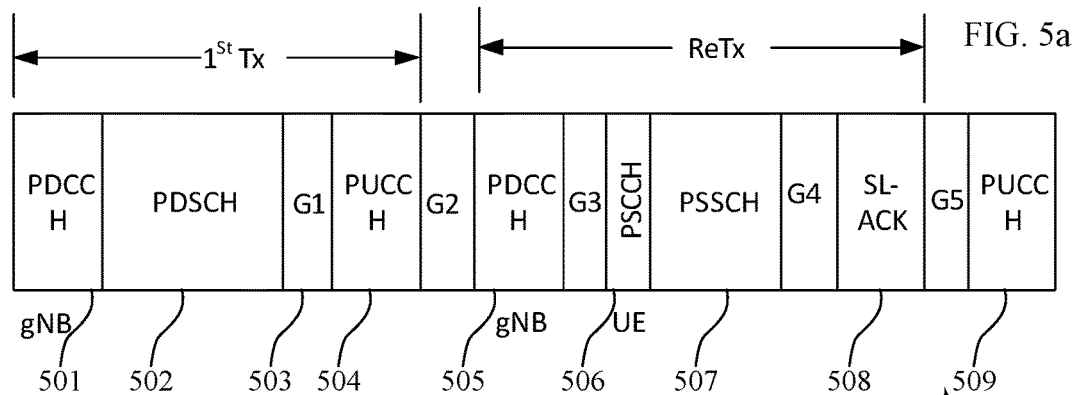
FIGS. 5a through 5d illustrate example timelines of communications between a network node and a helper UE in accordance with aspects of the present disclosure.

FIG. 5*a* shows an example timeline 500-*a* of operations by the base station, a helper UE and a target UE to accomplish data transmission from the base station to a target UE through a helper UE, using a sidelink between the helper UE and the target UE. Note that the operations shown in the timeline 500-*a* illustrate some example steps with an understanding that and some steps may be merged, or removed and the new steps may be added.

At 501, a base station such as a 5G gNB transmits a control message such as PDCCH. The control message may include a resource allocation of a sidelink between the target UE and the helper UE. The control message may be sent to both the target UE and the helper UE. This may correspond to transmitting the control message at 402 of FIG. 2.

At 502, the base station, upon transmitting the control messages, may transmit a data transmission to the helper UE and the target UE in a physical downlink shared channel (PDSCH) message. This may correspond to the first/initial data transmission at 404 of FIG. 4.

At 503, G1 is a guard interval to delineate the PDSCH at 502 and a physical uplink control channel (PUCCH) at 504. In one example, the guard interval is for the time division duplex (TDD) transmission scheme. Similarly, the G2, G3, G4, and G5 are subsequent guard intervals for FIG. 5*a* and other guard intervals, G1, G2, G3, G4, G5, G6, or G7, are for FIG. 5*b* through FIG. 5*d*.

At 504, the base station may receive a PUCCH from either the helper UE, the target UE, or both in response to the data transmission of PDSCH at 502. The PUCCH may include an ACK or NACK to the data transmission on PDSCH at 502. This may correspond to the uplink control message at 406 of FIG. 4.

At 505, the base station may transmit another control message PDCCH to initiate a retransmission /forwarding of the data transmission on PDSCH at 502. The retransmission is to be performed by the helper UE. This may correspond to the trigger message transmitted at 408 of FIG. 4.

At 506, the helper UE may transmit a control message to the target UE in a physical sidelink control channel (PSCCH) on a sidelink channel. The control message may indicate a resource allocation on the sidelink for the helper UE to forward the initial data transmission and for the target UE 115-*j* to know where to receive the forwarded initial data transmission. This may correspond to the DL control message sent at 410 of FIG. 4.

At 507, after a guard interval G3, and upon receiving the PDCCH transmitted at 505, the helper UE transmits a physical sidelink share channel (PSSCH) to the target UE to forward the data transmission received in PDSCH at 502. This may correspond to the retransmission of the received first data transmission at 412 of FIG. 4.

At 508, after a guard interval G4, the target UE sends a sidelink ACK to the helper UE using a sidelink channel between the helper UE and the target UE. This may correspond to the sidelink (SL) ACK transmitted at step 414 of FIG. 4.

At 509, after a guard interval G5, the helper UE transmits an uplink control message PUCCH, to report to the base station what is received in the SL-ACK that is received at 508. This may correspond to the uplink control message include ACK/NACK at step 416 of FIG. 4.

As indicated above, the operations shown in the timeline 500-*a* illustrate some example steps with an understanding that some steps may be merged, or removed and the new steps may be added. For example, an alternative to the trigger message in the PDCCH at 505 is not transmitting the trigger message at all. The helper UE may automatically forward the data transmission received at 502 to the target UE, once the helper UE determines that the data transmission is intended for the target UE, without waiting for a trigger message from the base station.

Figure 5B:
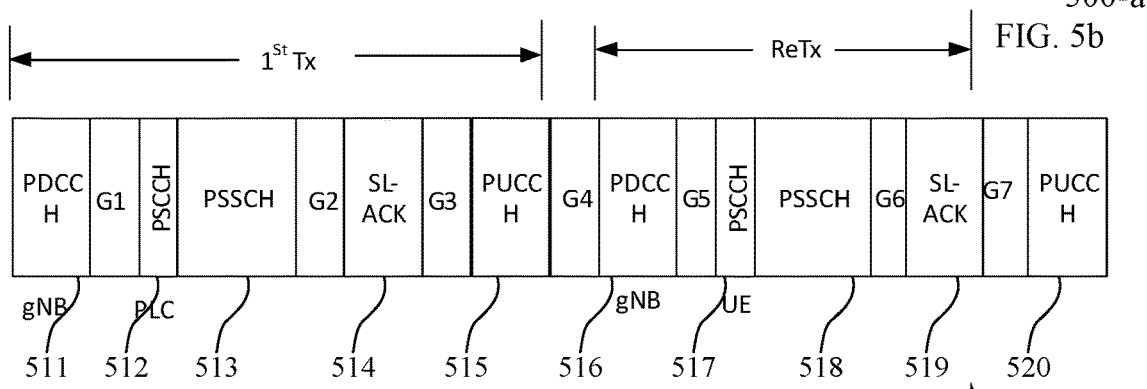

FIG. 5*b* shows an example timeline 500-*b* of operations by a base station, a PLC node, a helper UE, and a target UE to accomplish data transmission from the base station to a target UE through the PLC node and the helper UE, using a sidelink between the base station and the PLC node and a sideline between the helper UE and the target UE. One difference between the timeline 500-*a* and the timeline 500-*b* is that a PLC nod is involved in the process of transmitting data to a target UE through a helper UE and sidelink diversity.

At 511, a base station such as a 5G gNB transmits a control message PDCCH. The control message may include a resource allocation of a sidelink between the target UE and the helper UE. The control message is sent to the PLC node instead the helper UE, as indicated at 501.

At 512, after a guard interval at G1 and upon receiving the PDCC message transmitted at 511, the PLC node may transmit a control message PSCCH to the helper UE using a sidelink channel. In one example aspect, the PSCCH may simply forward the received control message PDCCH.

At 513, the PLC node may transmit an initial data transmission to the helper UE and the target UE in a physical shared sidelink channel (PSSCH). This may imply that the PLC is responsible for generating the initial data transmission. This may correspond to the first data transmission at 404 of FIG. 4 or the transmission of PDSCH at 502 of FIG. 5*a*.

At 514, the PLC node may receive an SL-ACK/NACK to the data transmission at 513 from the helper UE, the target UE or both on a sidelink (SL) channel. In one example aspect, the PLC node receives an ACK from the helper UE, a NACK or no response from the target UE. This means that the base station/PLC node needs to use the helper UE to retransmit/forward the initial data transmission to the target UE.

At 515, the PLC may send an uplink control message in a PUCCH to the base station. In one example aspect, the control message in the PUCCH may simply copy the SL ACK received at 514.

At 516, the base station may transmit another control message PDCCH to initiate/trigger a retransmission /forwarding of the PSSCH transmitted at 513. In one example aspect, the trigger message may be directly sent from the base station to the helper UE without going through the PLC node. This may correspond to the trigger message transmitted at 408 of FIG. 4 and the PDCC transmitted to the help UE at 505 of FIG. 5a.

At 517, the helper UE may transmit a control message to the target UE in a PSCCH (physical sidelink control channel) on a sidelink channel. The control message may indicate a resource allocation on the sidelink for the helper UE to forward the initial data transmission and for the target UE 115-j to receive the forwarded initial data transmission. This may correspond to the DL control message sent at 410 of FIG. 4 and the initial data transmission sent in the PSSCH at 507 of FIG. 5a.

At 518, upon receiving PDCCH transmitted at 516, the helper UE transmits a physical sidelink share channel (PSSCH) to the target UE to forward the data transmission received in PDSCH at 513, using the sidelink resource indicated at 517. This may correspond to the retransmission of the received first data transmission at 412 of FIG. 4 and forwarding of the initial data transmission at 507 of FIG. 5a.

At 519, after a guard interval G6, the target UE sends a sidelink ACK to the helper UE using a sidelink channel between the helper UE and the target UE. This may correspond to the SL ACK transmitted at step 414 of FIG. 4 and SL-ACK transmitted at 508 of FIG. 5a.

At 520, after a guard interval G7, the helper UE transmits an uplink control message PUCCH, to report to the base station what is received in the SL-ACK received at 519. This may correspond to the uplink ACK/NACK transmitted at step 416 of FIG. 4 or the SL_ACK at 508 of FIG. 5a As indicated above, the operations shown in the timeline 500-b illustrate some example steps with an understanding that and some steps may be merged, or removed and the new steps may be added. For example, an alternative to the trigger message in the PDCCH at 516 is not transmitting the trigger message at all. The helper UE may automatically forward the data transmission received at 513 to the target UE, once the helper UE determines that the data transmission is intended for the target UE, without waiting for a trigger message from the base station.

Figure 5C:
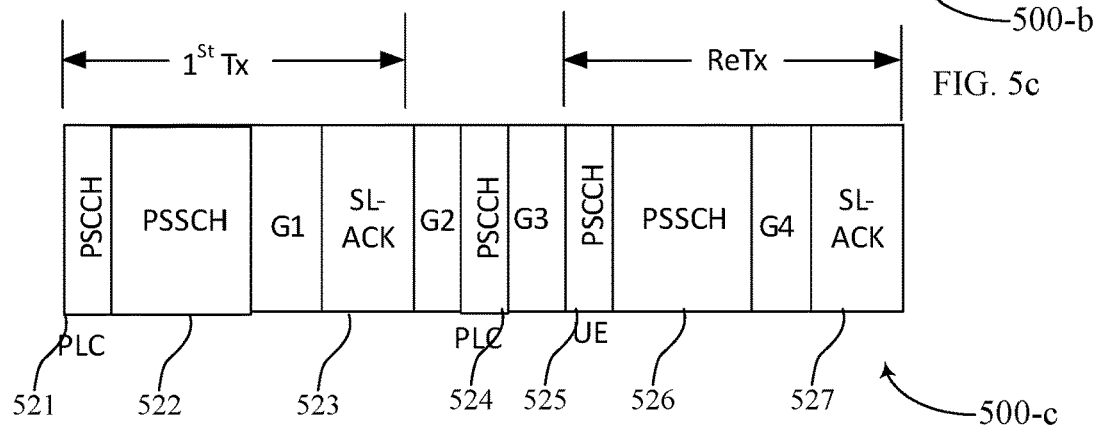

FIG. 5c shows an example timeline 500-c of operations by the PLC note, a helper UE and a target UE to accomplish data transmission from a PLC node to a target UE through a helper UE, using a sidelink between the PLC node and the helper UE and a sidelink between the helper UE and the target UE. One difference between the timeline 500-b and the timeline 500-c is that in the timeline 500-c, the PLC node functions as a base station without involvement from any other base station. Another difference is that the PLC node does not transit a trigger message to the helper UE to trigger the retransmission/forwarding of the initial data transmission. Note that the operations shown in the timeline 500-c illustrate some example steps with an understanding that and some steps may be merged, or removed and the new steps may be added.

At 521, a PLC node transmits a control message in a PSCCH. The control message may include a resource allocation of a sidelink between the target UE and the helper UE. The control message may be sent to both the target UE and the helper UE. This may correspond to transmitting the control message at 402 of FIG. 2, or transmitting the PDCCH at 501 of FIG. 5a or 511 of FIG. 5b.

At 522, the PLC node, upon transmitting the control message at 521, may transmit the initial data to the helper UE and the target UE in a sidelink PSSCH channel. This may correspond to the first data transmission at 404 of FIG. 4, the PDSCH at 502 of FIG. 5a, or at 513 of FIG. 5b.

At 523, after a guard interval G1, the PLC node receives a sidelink ACK to the initial data transmission sent at 522 from the helper UE, the target UE or both, using a sidelink channel between the PLC node and the helper UE or the target UE. This may correspond to the SL ACK transmitted at step 414 of FIG. 4, the SL-ACK at 519 of FIG. 5b or 508 of FIG. 5a.

At 524, the PLC node may transmit a control message to the helper UE in a PSCCH (physical sidelink control channel) on a sidelink channel. The control message may indicate a resource allocation on the sidelink for the helper UE to forward the initial data transmission and for the target UE to receive the forwarded data transmission. This may correspond to the DL control message sent at 410 of FIG. 4.

At 525, the helper UE may transmit a control message to the target UE in a PSCCH on a sidelink channel. The control message may forward to the target UE the control message the helper UE received at 524, to indicate a resource allocation on the sidelink for the helper UE to forward the initial data transmission and for the target UE to receive the forwarded data transmission.

At 526, the helper UE transmits a PSSCH to the target UE to forward the data transmission received in PDSCH at 522, using the sidelink resource indicated at 524. This may correspond to the retransmission of the received first data transmission at 412 of FIG. 4 and forwarding of the initial data transmission at 507 of FIG. 5a.

At 527, the target UE may send an ACK/NACK via a sidelink to the helper UE to indicate whether or not the forwarded data transmission has been successfully received.

Figure 5D:
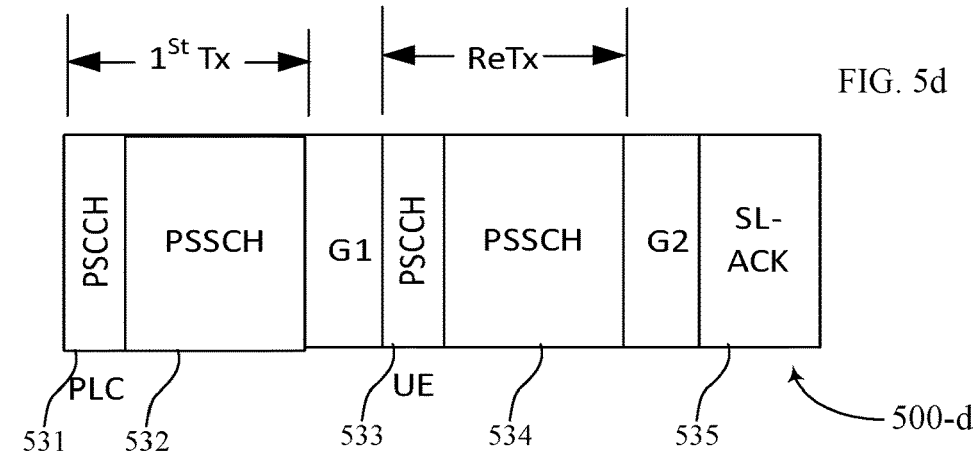

As indicated above, the operations shown in the timeline 500-c illustrate some example steps with an understanding that and some steps may be merged, or removed and the new steps may be added, as shown in FIG. 5d.

FIG. 5d shows an example alternative timeline 500-d of operations by a PLC note, a helper UE and a target UE to accomplish data transmission from the PLC node to the target UE through the helper UE, using a sidelink between the PLC node and the helper UE and a sidelink between the helper UE and the target UE. In the timeline 500-d, the PLC node functions as a base station without involvement from any other base station. The operations of 500-d is similar to that of 500-c, except for elimination of some steps in favor of a fast data transmission via sidelink forwarding.

At 531, the PLC node transmits a control message in a PSCCH. The control message may include a resource allocation of a sidelink between the target UE and the helper UE. The control message may be sent to both the target UE and the helper UE. This may correspond to transmitting the control message at 402 of FIG. 2, transmitting the PDCCH at 501 of FIG. 5a or transmitting the PDCCH at 511 of FIG. 5b.

At 532, the PLC node, upon transmitting the control messages, may transmit the initial data to the helper UE and the target UE in a sidelink PSSCH channel. This may correspond to the first data transmission at 404 of FIG. 4, or the PDSCH at 522 of FIG. 5c.

At 533, upon receiving PSCCH transmitted at 531, the helper UE transmits a physical sidelink control channel (PSCCH) to the target UE to forward the control message received at 531. The control message includes sidelink resource allocation for the helper UE to forward the data transmission received at 532 and for the target UE to receive the forwarded data transmission.

At 534, upon receiving PDCCH transmitted at 533, the helper UE transmits a PSSCH to the target UE to retransmit/forward the data transmission received in PDSCH at 532, using the sidelink resource indicated at 533. This may correspond to the retransmission of the received first data transmission at 412 of FIG. 4 and forwarding of the initial data transmission at 526 of FIG. 5c.

At 535, the helper UE may send an ACK/NACK via a sidelink to the PLC node to indicate whether or not the forwarded data transmission has been successfully received, assuming that the helper UE itself receives an ACK message from the target UE.

As indicated above, the operations shown in the timeline 500-d illustrate some example steps with an understanding that and some steps may be merged, or removed. The 500-d is simplified version of 500-c, with operations at 523 and 524 eliminated.

Figure 6:
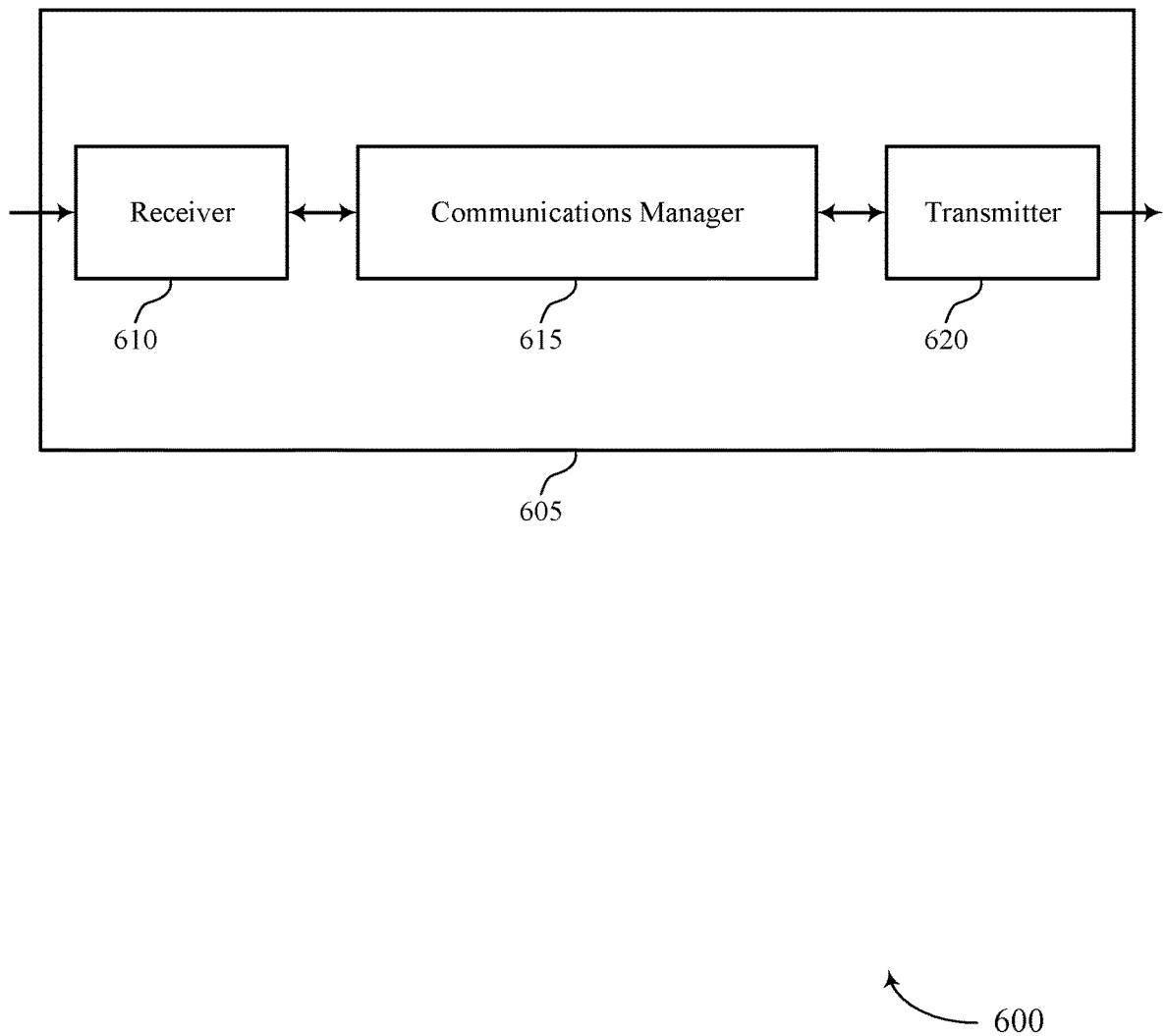
FIGS. 6 and 7 show block diagrams of devices in accordance with aspects of the present disclosure.

FIG. 6 shows a block diagram 600 of a device 605 in accordance with aspects of the present disclosure. The device 605 may be an example of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to forwarding data transmission using sidelink communication, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may be an example of aspects of the communications manager 715 as described herein. The communications manager 615 may be an example of aspects of the communications manager 910 described herein.

The transmitter 620 may transmit signals generated by other components of the device 605. In some example aspects, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
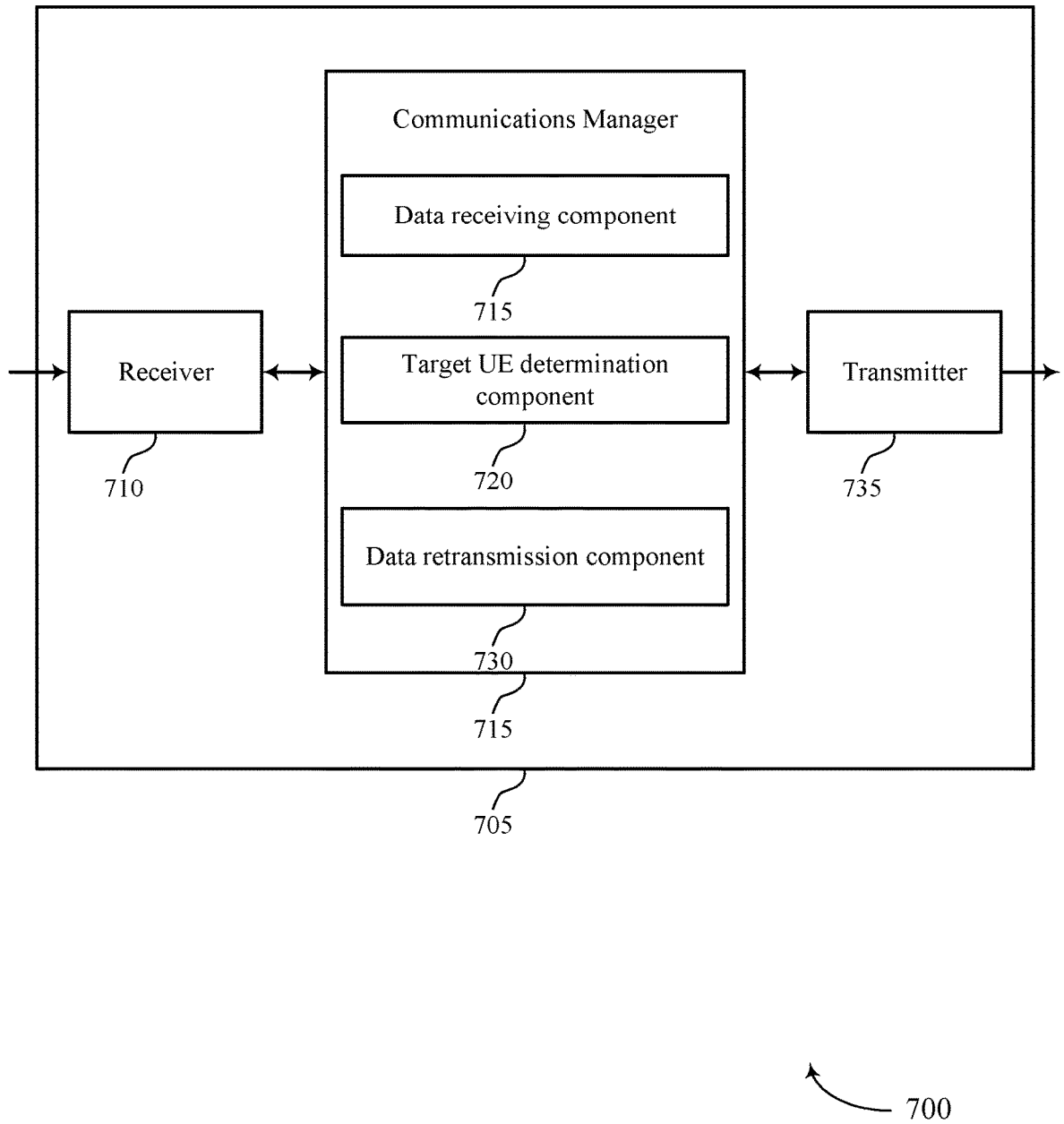

FIG. 7 shows a block diagram 700 of a device 705 in accordance with aspects of the present disclosure. The device 705 may be an example of a device 605, or a UE 115, as described herein. The device 705 may include a receiver 710, a communications manager 715, and a transmitter 735. The device 705 may also include a processor. Each of these components may be in communication with one another (e.g., via one or more buses).

The communications manager 715 may include a data receiving component 715, a target UE determination component 720, and a data retransmission component 730. The communications manager 715 may be an example of aspects of the communications manager 910 described herein.

The data receiving component 715 may receive an initial data transmission from a base station. The initial data transmission in either a unicast transmission to a UE or a multicast transmission to a group of UEs. If in a unicast transmission, the network node may send multiple transmissions to multiple UEs. If in a multicast transmission, the network node may use a Group-Radio Radio Network Temporary Identifier (G-RNTI) to identify a helper UE group and a target UE.

The target UE determination component 720 may determine whether the received data transmission is intended for the receiving UE or another UE such as a target UE. The target UE determination component 720 may determine whether the received data transmission is for the target UE based on a received control message.

The data retransmission component 730 may forward the received data transmission to a target UE. The data retransmission component 730 may know how to retransmit the initial data transmission based on a signaling message received from the network node.

The transmitter 735 may transmit signals generated by other components of the device 505. In some example aspects, the transmitter 735 may be collocated with a receiver 510 in a transceiver module. For example, the transmitter 735 may be an example of aspects of the transceiver 920 described with reference to FIG. 9. The transmitter 735 may utilize a single antenna or a set of antennas.

Figure 8:
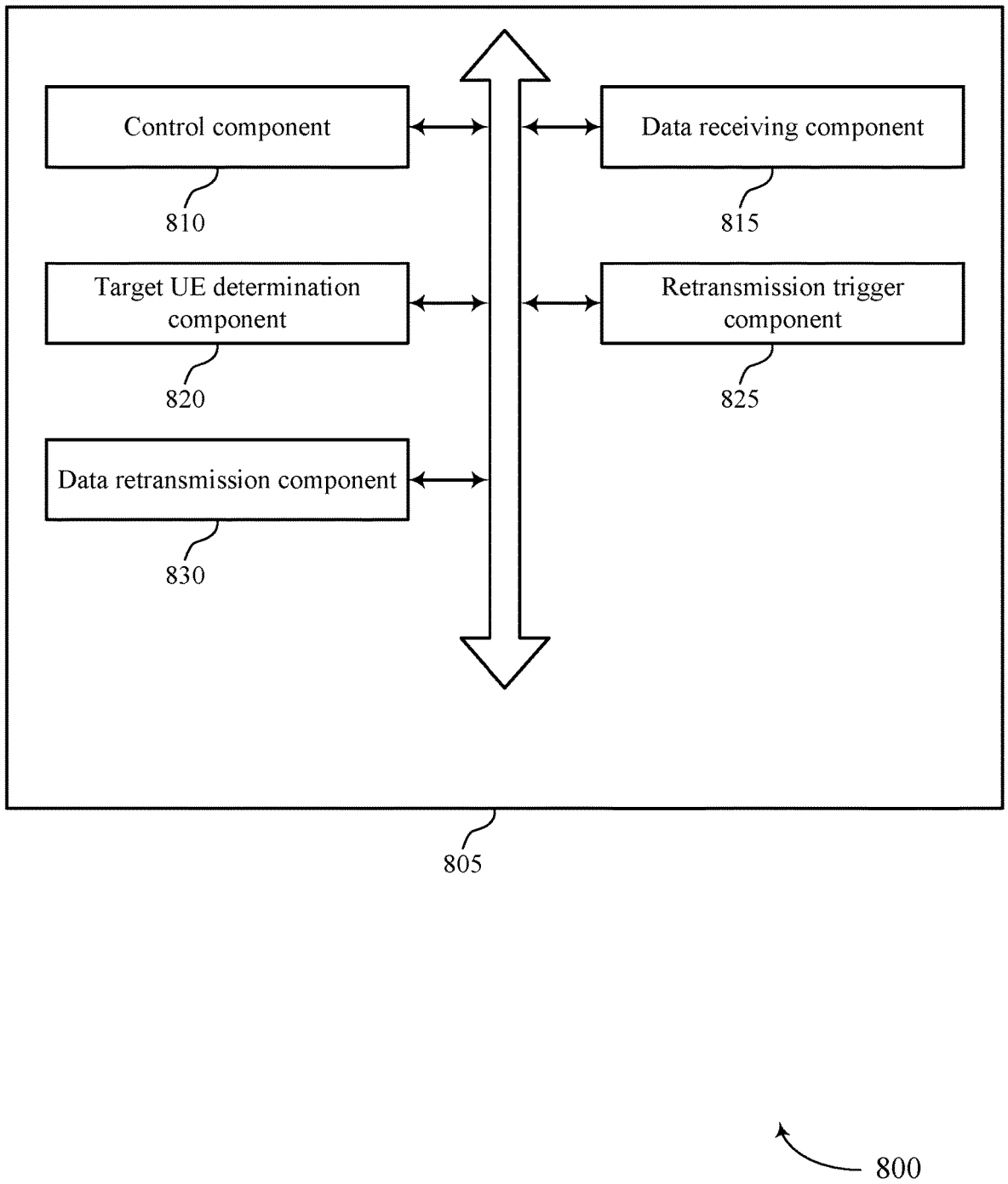
FIG. 8 shows a block diagram of a communications manager in accordance with aspects of the present disclosure.

FIG. 8 shows a block diagram 800 of a communications manager 805 in accordance with aspects of the present disclosure. The communications manager 805 may be an example of aspects of a communications manager 515, a communications manager 715, or a communications manager 910 described herein. The communications manager 805 may include a control component 810, a data receiving component 815, a target UE determination component 820, a retransmission trigger component 825, and a data retransmission component 830. Each of these modules may communicate, directly or indirectly, with one another (e.g., via one or more buses).

The control component 810 may transmit an uplink control message to and receive a control message from a network node. The data receiving component 815 may receive an initial data transmission from the network node.

The target UE determination component 820 may determine whether the received data transmission is intended for the receiving UE or another UE such as a target UE. The target UE determination component 820 may determine whether the received data transmission is for the target UE based on a received control message. The control message may have a field indicating whether the data transmission is for a UE other than the receiving UE.

The retransmission trigger component 825 may receive a trigger message from the base station to initiate forwarding of the initial data transmission by the helper to the target UE. The trigger message may be included in a downlink control message received from the base station. The data retransmission component 730 may forward the received data transmission to the target UE, based on a signaling message received the network node.

Figure 9:
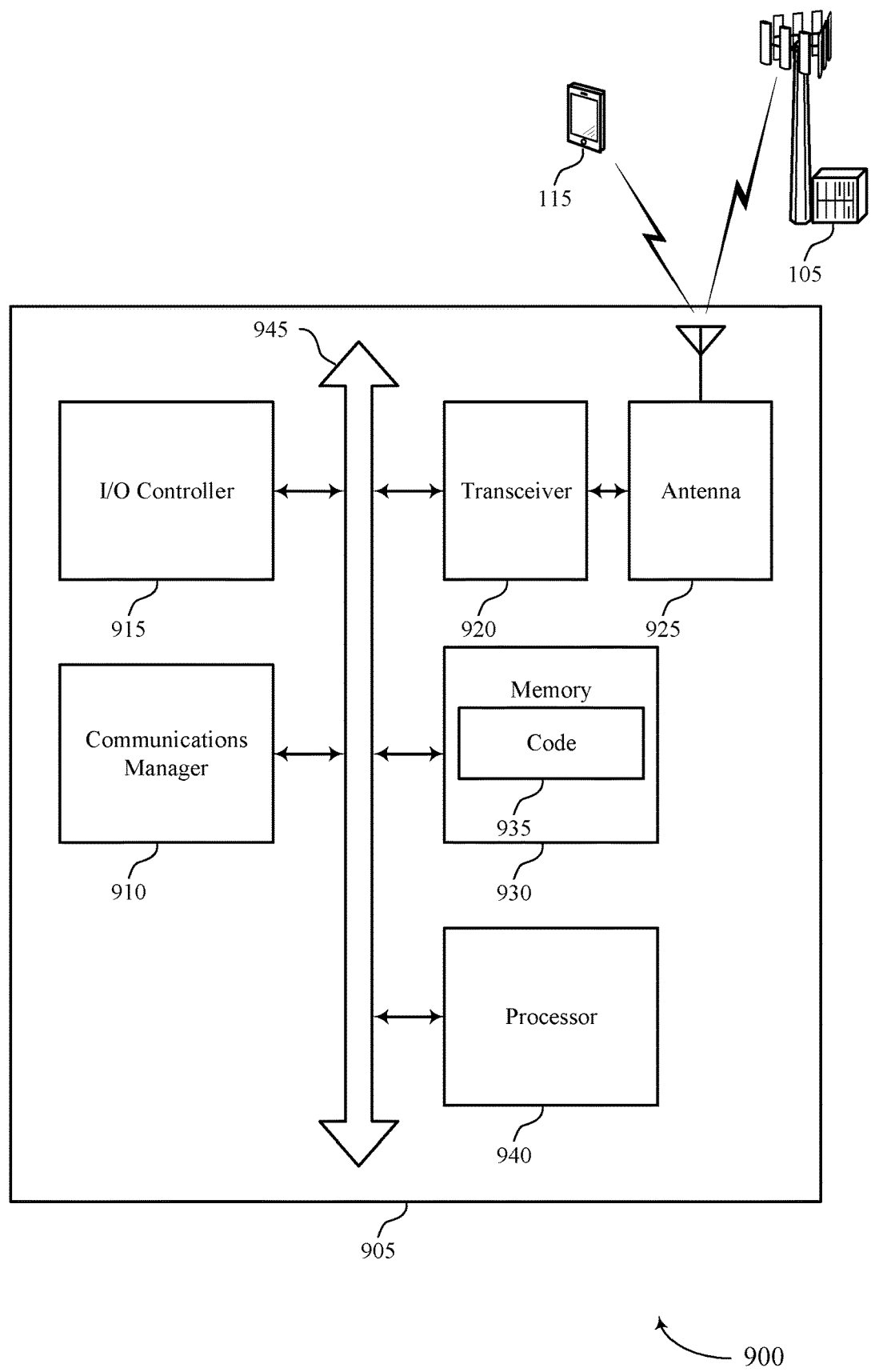
FIG. 9 shows a diagram of a system including a device in accordance with aspects of the present disclosure.

FIG. 9 shows a diagram of a system 900 including a device 905 in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a control message that indicates whether the report of sidelink channel diversity information and UE state information is scheduled or on demand and a resource allocation for the report. The communication manager 910 may determine whether a received data transmission is intended for the receiving UE or a target UE. The communication manager 910 may also retransmit/forward the received data transmission to the target UE.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting determining UE sidelink diversity information and UE state information to facilitate communications with another UE via a sidelink channel).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
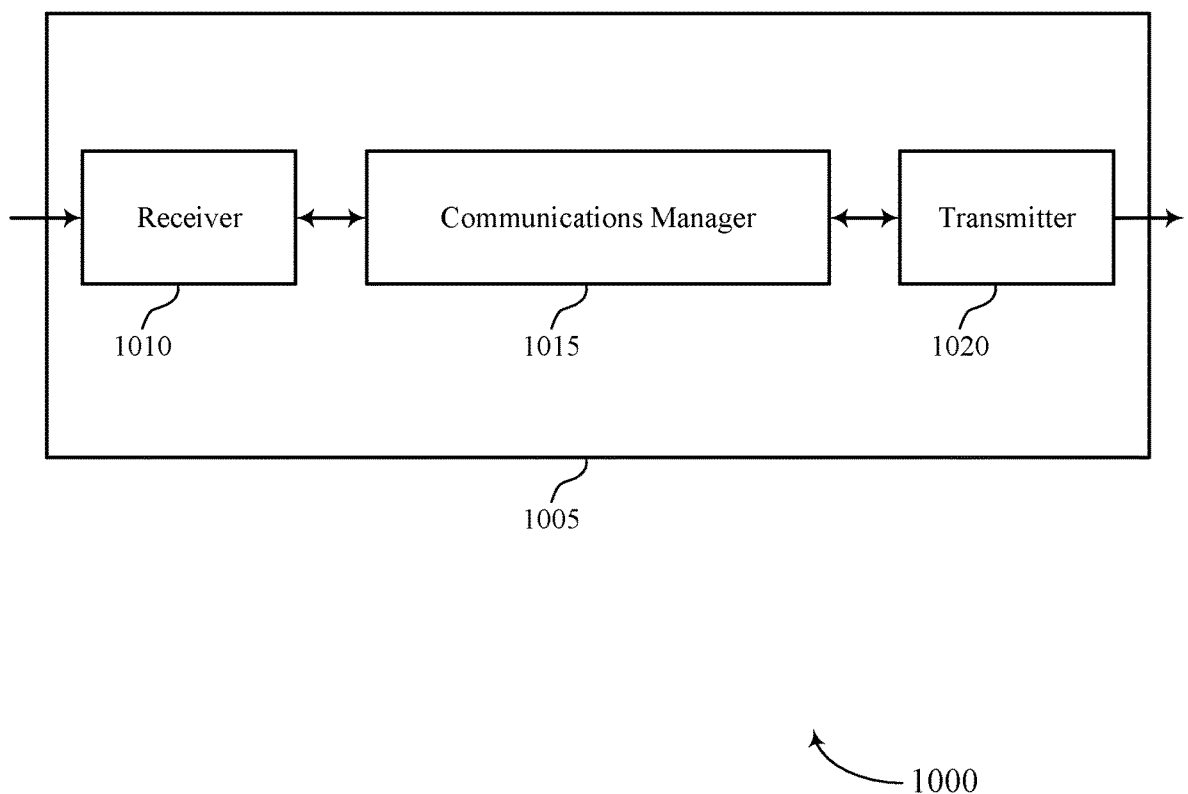
FIGS. 10 and 11 show block diagrams of devices in accordance with aspects of the present disclosure.

FIG. 10 shows a block diagram 1000 of a device 1005 in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to forwarding a data transmission to a target UE). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to one or more helper UEs, a control message that indicates a sidelink resource allocation and whether a data transmission is intended for a target UE or the receiving UE. The communications manager 1015 may transmit a data transmission to a helper UE to be forwarded to the target UE. The communications manager 1015 may be an example of aspects of the communications manager 1310 described herein.

The communications manager 1015, or its sub-components, may be implemented in hardware, code (e.g., software or firmware) executed by a processor, or any combination thereof If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some example aspects, the communications manager 1015, or its sub-components, may be a separate and distinct component in accordance with various aspects of the present disclosure. In some example aspects, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some example aspects, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
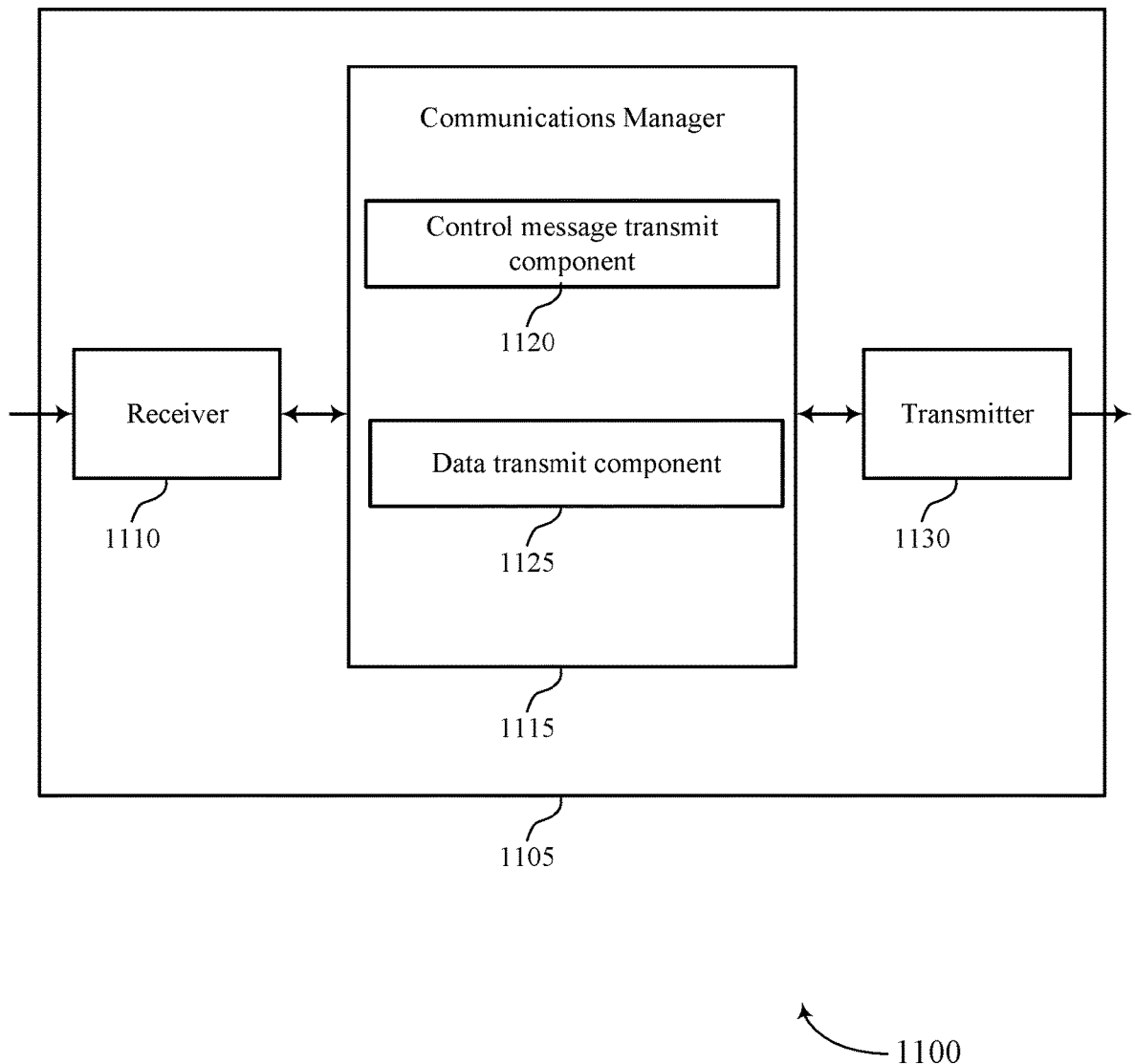

FIG. 11 shows a block diagram 1100 of a device 1105 in accordance with aspects of the present disclosure. The device 1105 may be an example of aspects of a device 1005, a base station 105, or the PLC node 210 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to forwarding a data transmission to a target UE, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1310 as described herein. The communications manager 1115 may include a control message transmit component 1120 and a data transmit component 1125. The communications manager 1115 may be an example of aspects of the communications manager 1310 or the communications manager 1015, described herein.

The control message transmit component 1120 may transmit a downlink control message to a PLC node, a helper UE, or a target UE. The downlink control message may include an indication of whether a downlink data transmission is for the receiving UE or a target UE, an indication of whether or not the receiving UE should process at least part of a data transmission, and a sidelink resource allocation for a helper UE to forward the data transmission to the target UE.

The data transmit component 1125 may transmit a data transmission to a set of helper UEs and the target UE. The data transmit component 1125 may send an initial data transmission in either a unicast transmission to a UE or a multicast transmission to a group of UEs. If in a unicast transmission, the network node may send multiple transmission to multiple UEs. If in a multicast transmission, the network node may use a Group-Radio Radio Network Temporary Identifier (G-RNTI) to identify a helper UE group and the target UE.

The transmitter 1130 may transmit signals generated by other components of the device 1105. In some example aspects, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
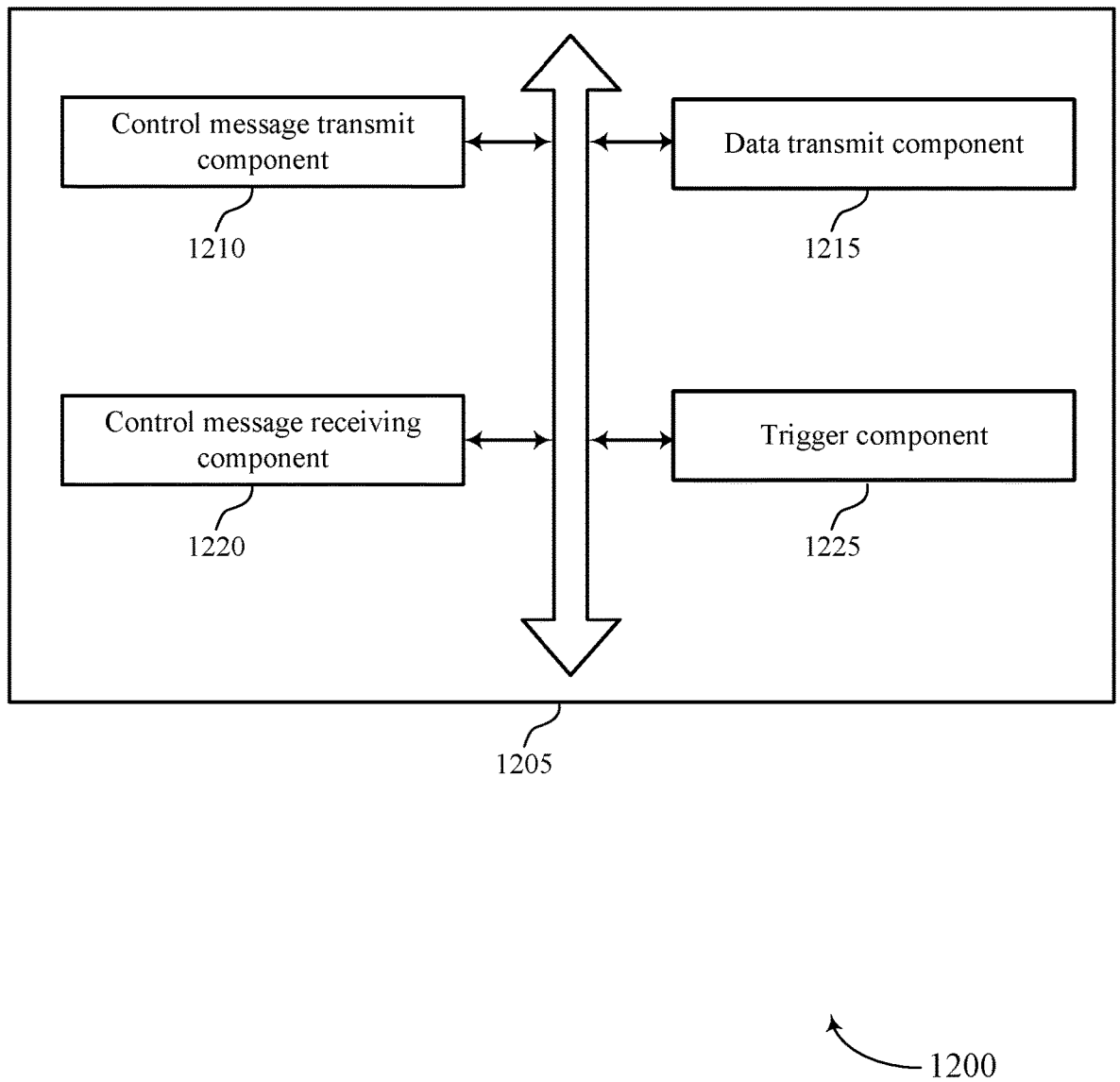
FIG. 12 shows a block diagram of a communications manager in accordance with aspects of the present disclosure.

FIG. 12 shows a block diagram 1200 of a communications manager 1205 in accordance with aspects of the present disclosure. The communications manager 1205 may be an example of aspects of a communications manager 1015, a communications manager 1115, or a communications manager 1310 described herein. The communications manager 1205 may include a control message transmit component 1210, a data transmission component 1215, a control message receiving component 1220, and a trigger component 1225. Each of these modules may communicate, directly or indirectly, with one another (e.g., via one or more buses).

The control message transmit component 1210 may transmit a downlink control message to a PLC node, a helper UE, or a target UE. The downlink control message may include an indication of whether a downlink data transmission is for the receiving UE or a target UE, an indication of whether or not the receiving UE should process at least part of a data transmission, and a sidelink resource allocation for a helper UE to forward the data transmission to the target UE.

The data transmit component 1215 may transmit a data transmission to a set of helper UEs and a target UE. The data transmit component 1125 may send an initial data transmission in either a unicast transmission to a UE or a multicast transmission to a group of UEs. If in a unicast transmission, the network node may send multiple transmission to multiple UEs.

The control message receiving component 1220 may receive and process an uplink control message. The uplink control message may include an ACK/NACK from a UE such as a helper UE or a target UE.

The trigger component 1225 may determine whether or not to send a trigger message to trigger a helper UE to initiate forwarding of a data transmission to a target UE. In one example aspect, the trigger message is included in a downlink control message.

Figure 13:
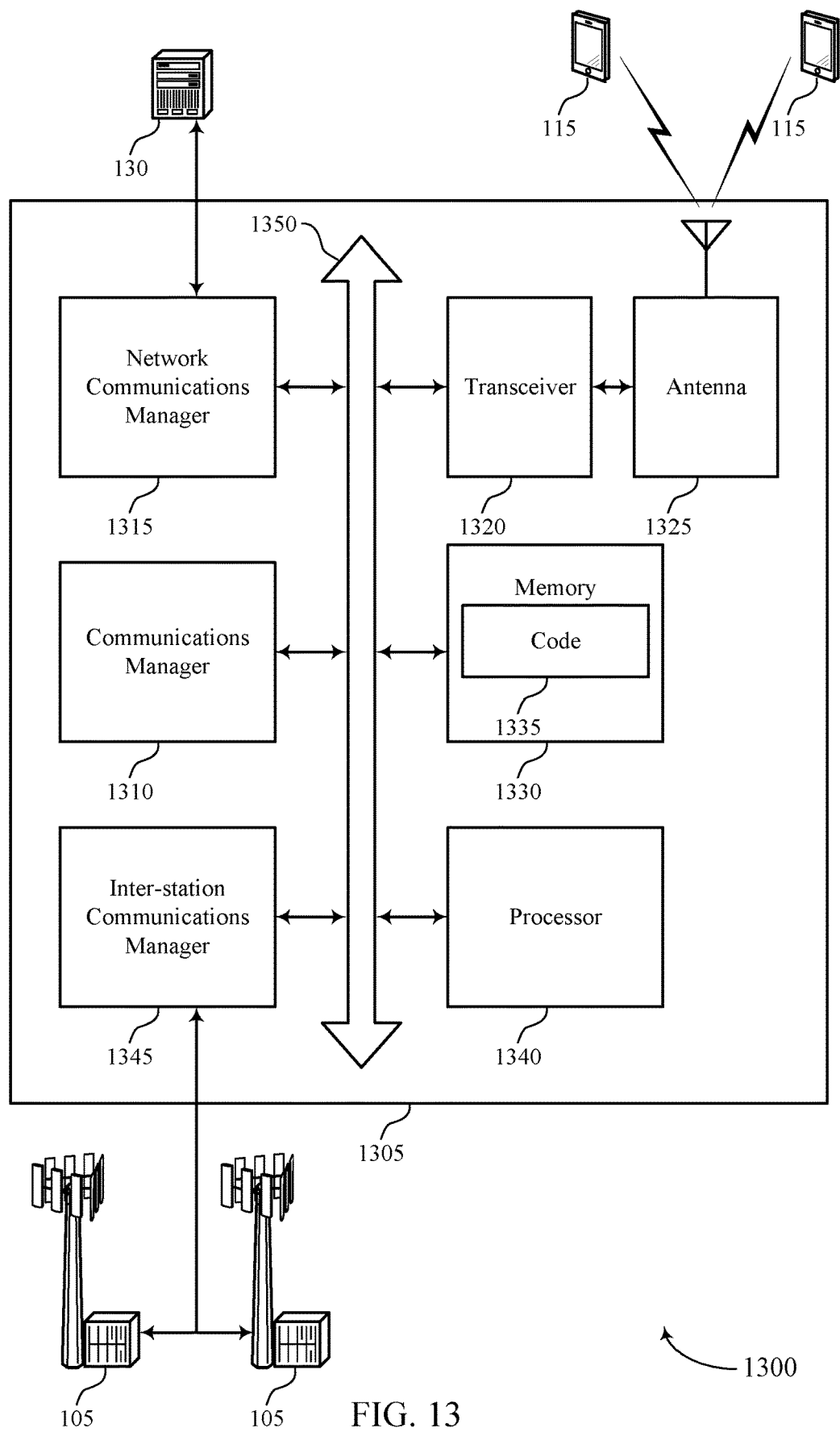
FIG. 13 shows a diagram of a system including a device in accordance with aspects of the present disclosure.

FIG. 13 shows a diagram of a system 1300 including a device 1305 in accordance with aspects of the present disclosure. The device 1305 may be an example of or include the components of device 1005, device 1105, a base station 105, or a PLC node 210 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to one or more helper UEs, a control message that indicates a sidelink resource allocation and whether a data transmission is intended for a target UE or the receiving UE. The communications manager 1015 may transmit a data transmission to a helper UE to be forwarded to the target UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting sounding reference signal channel measurement for sidelink communication).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some example aspects, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
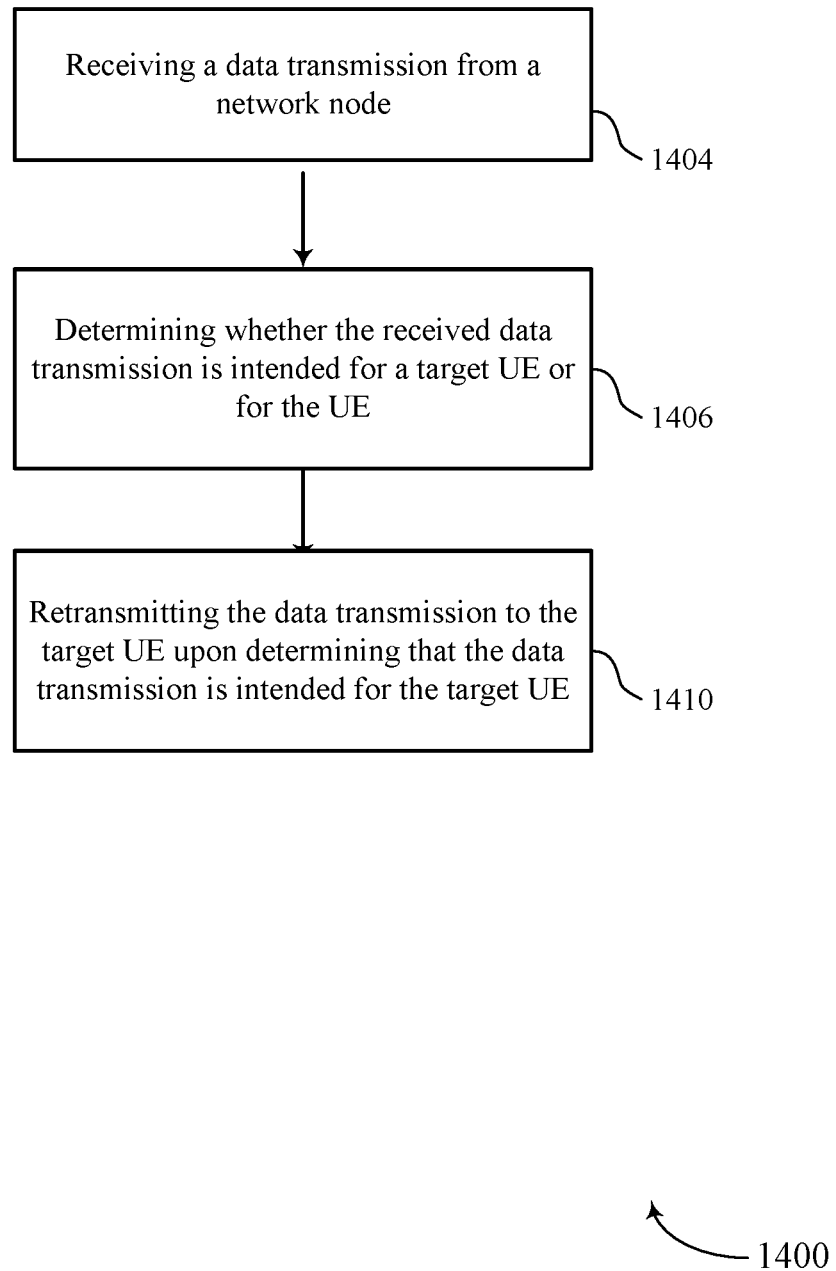
FIGS. 14 through 15 show flowcharts illustrating methods performed by a UE or a like device in accordance with aspects of the present disclosure.

FIG. 14 shows a flowchart illustrating a method 1400 in accordance with aspects of the present disclosure. The operations of method 1400 may be implemented by a UE 115 or its components as described herein. For example, the operations of method 1400 may be performed by a communications manager as described with reference to FIGS. 6 through 9. In some example aspects, a UE may execute a set of instructions to control the functional elements of the UE to perform the functions described below. Additionally or alternatively, a UE may perform aspects of the functions described below using special-purpose hardware. In one example aspect, the UE performing the method 1400 is a helper UE.

At 1404, the UE receives a data transmission from a network node. The network node may be a base station, or a PLC node as described with reference to FIG. 1 and FIGS. 2a-2b. The operations of 1404 may be performed according to the methods described herein. In some example aspects, aspects of the operations of 1404 may be performed by a data receiving component as described with reference to FIGS. 6 through 9.

At 1404, the UE receives the data transmission in either a unicast transmission or a multicast transmission via a Group-Radio Radio Network Temporary Identifier (G-RNTI). In one example, the multicast transmission is to a UE group which comprises at least a helper UE group and a target UE. The helper UE group may include a group of UEs each of which may potentially help the network node forward/retransmit the data transmission to the target UE. In one example, the receiving UE is a member of the helper UE group.

At 1406, the UE may determine whether the received data transmission is intended for a target UE or for the UE itself.

The operations of 1406 may be performed according to the methods described herein. In some example aspects, aspects of the operations of 1406 may be performed by a target UE determination component as described with reference to FIGS. 6 through 9.

At 1406, in one example aspect, the UE may determine whether the received data transmission is for the target UE based on a received control message. The control message may indicate whether the data transmission is for the receiving UE or for the target UE via a downlink control information (DCI) included in a PDCCH message. For example, the DCI field may have a one-bit field indicating whether or not the data transmission is for the receiving UE.

In another example aspect, the UE determines whether the received data transmission is for the target UE via a map of a set of UEs. The map is capable of uniquely identifies the target UE. For example, the map can be of a format {G_RNTI: targeted UE identity}. Hence when the UE uses the G_RNTI to decode a received PDCCH, and then decode the corresponding data transmission in a PDSCH, the UE knows the data transmission is for a UE matching a targeted UE identity in the map. The map may be configured into the helper UE via in a semi-persistent manner using an RRC message from the base station.

At 14010, the UE retransmit the received data transmission to the target UE upon determining that the data transmission is intended for the target UE. The operations of 1410 may be performed according to the methods described herein. In some example aspects, aspects of the operations of 1406 may be performed by a data retransmission component as described with reference to FIGS. 6 through 9.

In one example aspect, the retransmitting of the data transmission includes forwarding the data transmission to the target UE after decoding at least part of the receiving data transmission. In an alternative example aspect, the retransmitting of the data transmission includes forwarding the data transmission to the target UE without decoding any part of the received data transmission. The UE may know how to retransmit the received data transmission based on a signaling message received from the network node. The control message received prior to receiving the data transmission may include an indication of whether or not the receiving UE shall process the data transmission intended for another UE.

The method 1400 is for illustration purpose and shows one possible process for a UE or a helper UE to facilitate communications between the base station and a target UE using a sidelink channel. In practice, one or more steps shown in the illustrative flowchart for the method 1400 may be combined with other steps, performed in any suitable order, performed in parallel (e.g., simultaneously or substantially simultaneously), or removed.

Figure 15:
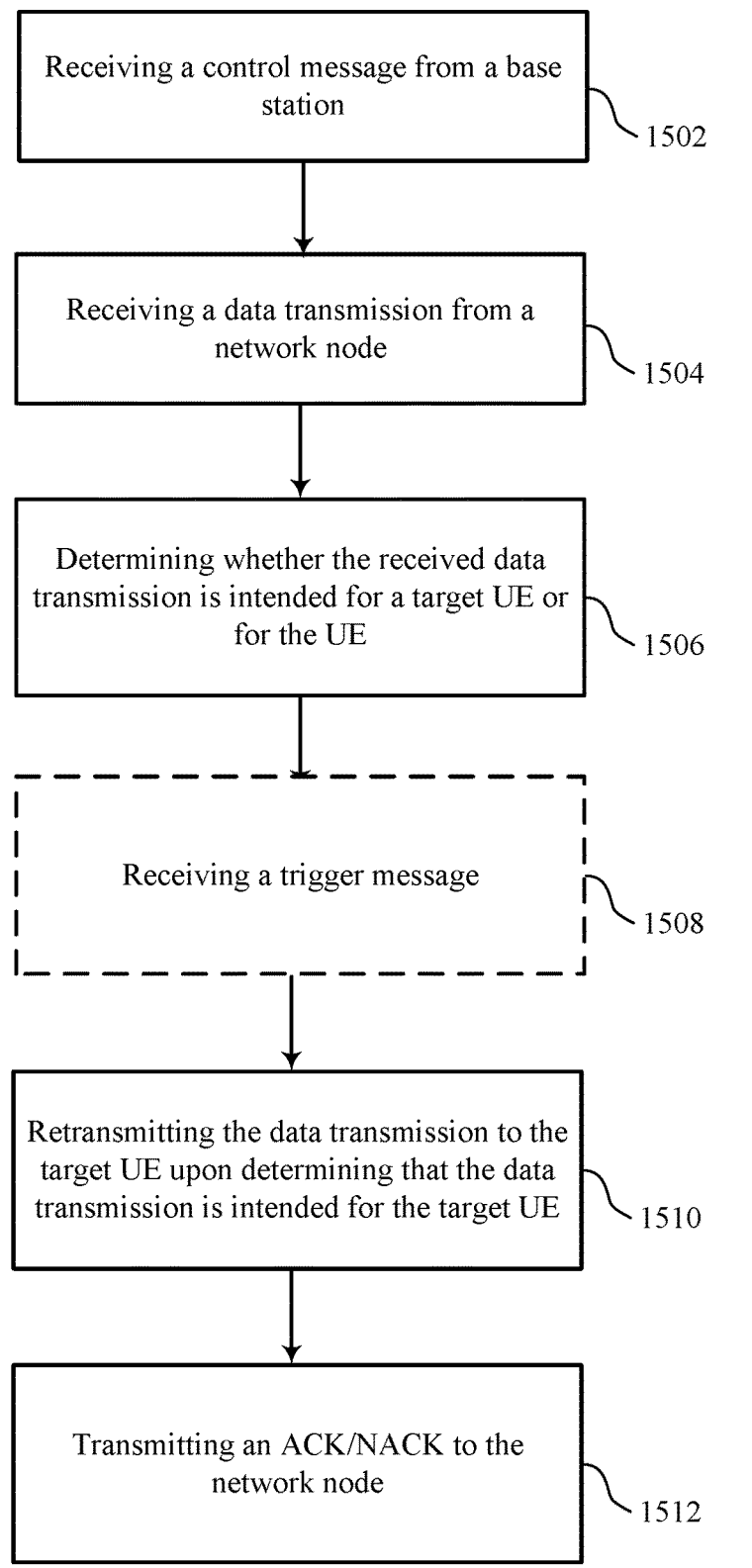

FIG. 15 shows a flowchart illustrating a method 1500 in accordance with aspects of the present disclosure. The operations of method 1500 may be implemented by a UE 115 or its components as described herein. For example, the operations of method 1500 may be performed by a communications manager as described with reference to FIGS. 6 through 9. In some example aspects, a UE may execute a set of instructions to control the functional elements of the UE to perform the functions described below. Additionally or alternatively, a UE may perform aspects of the functions described below using special-purpose hardware. In one example aspect, the UE performing the method 1500 is a helper UE.

At 1502, the UE receives a control message from a network node such as the base station 105 of FIG. 1 or a PLC node such as 210 of FIG. 2b. As described herein, the terms network node and base station may be used interchangeably, as made obvious by the context. The operations of 1502 may be performed according to the methods described herein. In some example aspects, aspects of the operations of 1502 may be performed by a control component as described with reference to FIGS. 6 through 9.

In one example aspect, the control message may include a downlink control information (DCI) field included in a PDCCH included in the received control message. The control message may include a sidelink resource allocation for retransmitting an initial data transmission if the data transmission is intended for a UE other than the receiving UE. The control message may also include an indication of whether to process at least part of the initial data transmission. Also included in the control message may be a target UE identifier. In one example aspect, the control message is received prior to receiving the initial data transmission.

At 1504, the UE receives a data transmission from the network node. The network node may be a base station, or a PLC node as described with reference to FIG. 2b. The operations of 1504 may be performed according to the methods described herein. In some example aspects, aspects of the operations of 1504 may be performed by a data receiving component as described with reference to FIGS. 6 through 9.

At 1504, the UE receives the data transmission in either a unicast transmission or a multicast transmission via a Group-Radio Radio Network Temporary Identifier (G-RNTI). In one example, the multicast transmission is to a UE group which comprises at least a helper UE group and the target UE. The helper UE group may include a group of UEs each of which may potentially help the network node forward/retransmit the data transmission to the target UE. In one example, the receiving UE is a member of the helper UE group.

At 1506, the UE may determine whether the received data transmission is intended for a target UE or for the receiving UE itself. The operations of 1506 may be performed according to the methods described herein. In some example aspects, aspects of the operations of 1506 may be performed by a target UE determination component as described with reference to FIGS. 6 through 9.

At 1506, in one example aspect, the UE may determine whether the received data transmission is for the target UE based on a received control message. The control message may indicate whether the data transmission is for the receiving UE or for the target UE via a downlink control information (DCI) field included in a PDCCH message. For example, the DCI field may have a one-bit field indicating whether or not the data transmission is for the receiving UE.

In another example aspect, the UE may determine whether the received data transmission is for the target UE via a map of a set of UEs. The map is capable of uniquely identifies the target UE. In one example aspect, the map can be of a format {G_RNTI: targeted UE identity}. Hence when the UE uses the G_RNTI to decode a received PDCCH, and then decode the corresponding data transmission in a PDSCH, the UE knows the data transmission is for a UE matching a targeted UE identity in the map. The map may be configured into the helper UE via in a semi-persistent manner in an RRC message from the network node.

At 1508, the UE receives a trigger message from the base station to initiate forwarding of the received data transmission by the helper to the target UE. The operations of 1508 may be performed according to the methods described herein. In some example, aspects of the operations of 1506 may be performed by a retransmission trigger component 825 as described with reference to FIGS. 6 through 9.

In one example aspect, the trigger message is included in a control message received from the base station. In one example aspect, the UE receives the trigger message upon successfully decoding at least part of the data transmission and upon the UE transmitting an indication to the base station that at least part of the data transmission has been successfully decoded. In one example aspect, the trigger message further comprises a modulation and coding scheme (MCS), a precoding matrix indicator (PMI), and a rank indicator (RI) for the UE to retransmit the data transmission to the target UE.

In one example aspect, the step of receiving trigger message is optional and may be eliminated all together. The UE may initiate forwarding of the received data transmission without waiting for any trigger message. This helper UE behavior may be configured by the base station via an RRC message in a semi-persistent manner.

At 1510, the UE retransmit the received data transmission to the target UE upon determining that the data transmission is intended for the target UE. The operations of 1510 may be performed according to the methods described herein. In some example aspects, aspects of the operations of 1510 may be performed by a data retransmission component as described with reference to FIGS. 6 through 9.

In one example aspect, the retransmitting of the data transmission includes forwarding the data transmission to the target UE after decoding at least part of the data transmission. In an alternative example aspect, the retransmitting of the data transmission includes forwarding the data transmission to the target UE without decoding any part of the received data transmission. The UE may know how to retransmit the initial data transmission based on a signaling message received from the network node. The control message received prior to receiving the initial data transmission may include an indication of whether or not a receiving UE shall process the data transmission intended for another UE.

At 1512, the UE transmits an uplink ACK/NACK to the base station/network node to indicate whether the retransmission of the data transmission is successful. The uplink control message may be transmitted in a PUCCH. The operations of 1512 may be performed according to the methods described herein. In some example aspects, aspects of the operations of 1512 may be performed by the control component as described with reference to FIGS. 6 through 9.

The helper UE may send the ACK/NACK message to the base station upon receiving an ACK/NACK from the target UE. The target UE may send an ACK upon its successfully decoding of the forwarded data transmission on a sidelink between the target UE and the helper UE. The resource for the helper UE to send the ACK/NACK can be allocated in the downlink control message that carries the trigger message if the trigger message is present. In an alternative example, the sidelink resource allocation for the ACK/NACK can be carried in the downlink control message received at 1502.

The method 1500 is for illustration purpose and shows one possible process for a UE or a helper UE to facilitate communications between the base station and a target UE using a sidelink channel. In practice, one or more steps shown in the illustrative flowchart for the method 1500 may be combined with other steps, performed in any suitable order, performed in parallel (e.g., simultaneously or substantially simultaneously), or removed.

Figure 16:
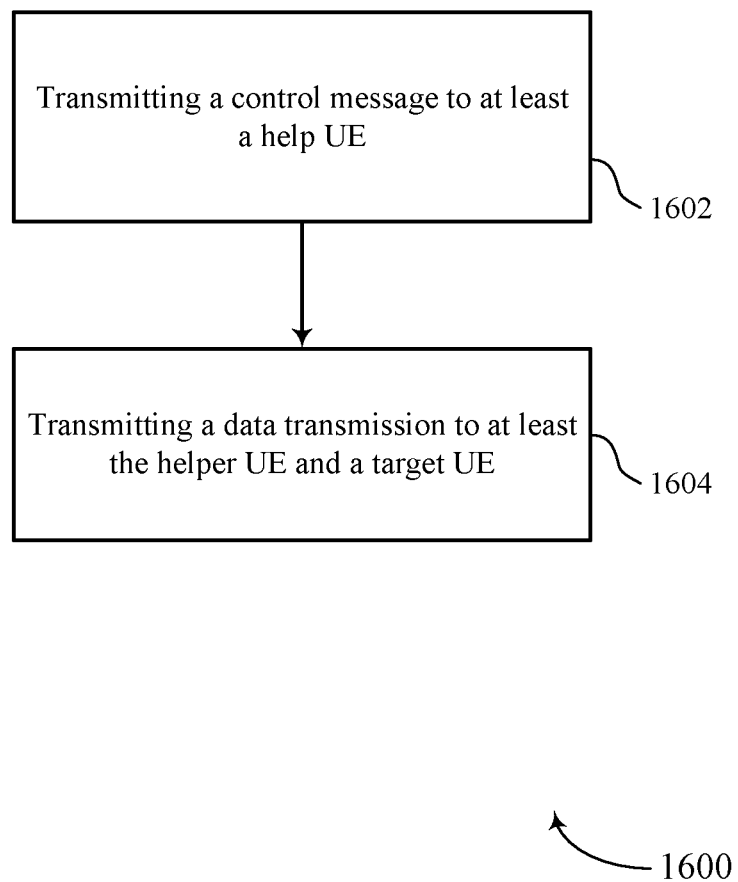
FIGS. 16 through 17 show flowcharts illustrating methods performed by a base station or a like device in accordance with aspects of the present disclosure.

FIG. 16 shows a flowchart illustrating a method 1600 in accordance with aspects of the present disclosure. The operations of method 1600 may be implemented by a network node such as a base station 105 of FIG. 1 or a PLC node 210 of FIG. 2b, or by some components of the network node as described herein. For example, the operations of method 1600 may be performed by a communications manager as described with reference to FIGS. 10 through 13. In some example aspects, a base station may execute a set of instructions to control the functional elements of the base station to perform the functions described below. Additionally or alternatively, a base station may perform aspects of the functions described below using special-purpose hardware. As described herein, the terms network node and base station may be used interchangeably, as made obvious by the context.

At 1602, the network node transmits a control message to at least one helper UE. The operations of 1602 may be performed according to the methods described herein. In some example aspects, aspects of the operations of 1602 may be performed by a control message transmit component as described with reference to FIGS. 10 through 13.

At 1602, the network node sends a control message to one or more helper UEs. In one example aspect, the control message is a PDCCH that may include a downlink control information (DCI) field to indicate whether a receiving UE shall process at least part of a subsequent data transmission that is meant for a UE other than the receiving UE, such as a target UE. The control message may include a sidelink resource allocation for retransmitting the data transmission if the data transmission is intended for the target UE. Also included in the control message may be a target UE identifier.

At 1604, the network node may send an initial data transmission in either a unicast transmission to a helper UE or a multicast transmission to a group of UEs. If in a unicast transmission, the network node may send multiple unicast transmissions to multiple UEs. If in a multicast transmission, the network node may use a Group-Radio Radio Network Temporary Identifier (G-RNTI) to include a helper UE group and the target UE. In one example aspect, the initial data transmission is sent to the target UE and a failure to receive a positive ACK from the target UE may trigger the network node to send a trigger message to a helper UE to trigger the forwarding of the initial data transmission to the target UE.

The method 1600 is for illustration purpose and shows one possible process for a helper UE to facilitate communications between the base station and a target UE using a sidelink channel. In practice, one or more steps shown in the illustrative flowchart for the method 1600 may be combined with other steps, performed in any suitable order, performed in parallel (e.g., simultaneously or substantially simultaneously), or removed.

Figure 17:
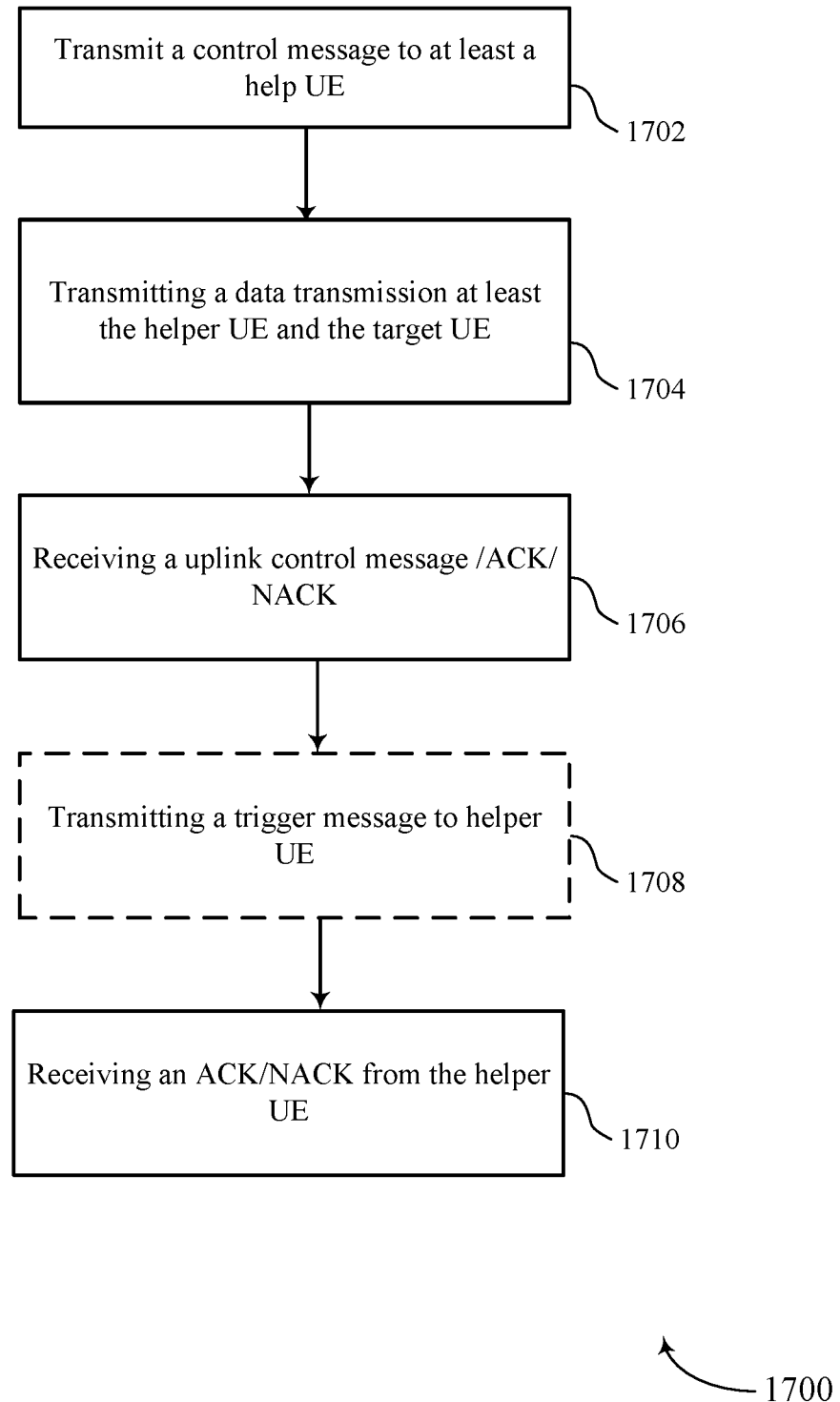

FIG. 17 shows a flowchart illustrating a method 1700 in accordance with aspects of the present disclosure. The operations of method 1700 may be implemented by a network node such as a base station 105 of FIG. 1 or a PLC node 210 of FIG. 2b, or by some components of the network node as described herein. For example, the operations of method 1700 may be performed by a communications manager as described with reference to FIGS. 10 through 13.

In some example aspects, a base station may execute a set of instructions to control the functional elements of the base station to perform the functions described below. Additionally or alternatively, a base station may perform aspects of the functions described below using special-purpose hardware. In the context of FIGS. 14-17, the terms network node and base station/PLC node may be used exchangeably, as made obvious in the context.

At 1702, the network node transmits a control message to at least one helper UE. The operations of 1702 may be performed according to the methods described herein. In some example aspects, aspects of the operations of 1702 may be performed by a control message transmit component as described with reference to FIGS. 10 through 13.

In one example aspect, the control message is a PDCCH that may include a downlink control information (DCI) field to indicate whether a receiving UE shall process at least part of a subsequent data transmission that is meant for a UE other than the receiving UE, such as a target UE. The control message may include a sidelink resource allocation for retransmitting the data transmission if the data transmission is intended for the target UE. Also included in the control message may be a target UE identifier.

At 1704, the network node may send an initial data transmission to a group of UEs. The group of UEs may include a helper UE group and a target UE. The data transmission may be in either a unicast transmission or a multicast transmission. If in a unicast transmission, the network node may send multiple transmissions to multiple UEs. If in a multicast transmission, the network node may use a Group-Radio Radio Network Temporary Identifier (G-RNTI) to include the UE group. In one example aspect, the initial data transmission is also sent to the target UE and a failure to receive a positive ACK from the target UE triggers the network node to send a trigger message to a helper UE to trigger the forwarding of the initial data transmission to the target UE.

At 1706, the network node may receive an uplink control message including an ACK/NAK to the initial data transmission sent to the target UE and one or more helper UEs. The operations of 1704 may be performed according to the methods described herein. In some example aspects, aspects of the operations of 1602 may be performed by a control message receiving component as described with reference to FIGS. 10 through 13.

In one example aspect, the network node/base station may receive a positive ACK from the target UE, despite the fact that the base station had detected previously that the downlink channel to the target UE was broken. This may avoid the situation where a previously broken downlink channel between the network node and the target UE comes back, but the network node still trigger a helper UE to forward the data transmission to the target UE that already received the data transmission.

At 1708, the network node may send a trigger message to a helper UE to initiate the forwarding of the initial data transmission to the target UE. The operations of 1708 may be performed according to the methods described herein. In some example aspects, aspects of the operations of 1708 may be performed by a trigger component as described with reference to FIGS. 10 through 13.

In one example aspect, the trigger message is included in a downlink control message sent from the network/base station. In one example aspect, the network node may send the trigger message upon receiving an indication from the helper UE that it has successfully decoded at least part of the data transmission. In one example aspect, the trigger message further comprises a modulation and coding scheme (MCS), a precoding matrix indicator (PMI), and a rank indicator (RI) for the helper UE to retransmit the data transmission to the target UE.

In one example aspect, the step of sending a trigger message is optional and may be eliminated all together. The network node may configure the helper UE to initiate the forwarding of the received data transmission without waiting for any trigger message. The network node may accomplish this via an RRC message in a semi-persistent manner.

At 1710, the network node may receive an uplink ACK/NACK from the helper UE to indicate whether the retransmission of the data transmission to the target UE is successful. The uplink control may be transmitted in a PUCCH. The operations of 1710 may be performed according to the methods described herein. In some example aspects, aspects of the operations of 1710 may be performed by a control message receiving component as described with reference to FIGS. 10 through 13.

The helper UE may send the ACK/NACK message to the base station upon receiving an ACK/NACK from the target UE. The target UE may send an ACK upon its successfully decoding the forwarded data transmission on a sidelink between the target UE and the helper UE. The network node may allocate the ACK/NACK resource for the helper UE to send the ACK/NACK in the downlink control message that carries the trigger message if the trigger message is present. In an alternative example aspect, the resource allocation for the ACK/NACK can be carried in the downlink control message transmitted at 1702.

The method 1700 is for illustration purpose and shows one possible process for a network node to transmit a data transmission to a target UE through a helper UE using a sidelink channel. In practice, one or more steps shown in the illustrative flowchart for the method 1700 may be combined with other steps, performed in any suitable order, performed in parallel (e.g., simultaneously or substantially simultaneously), or removed.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications performed by a helper user equipment (UE), comprising:
   receiving a data transmission from a network node;
   receiving a downlink control information (DCI) message including a field indicating whether the data transmission is intended for the helper UE or a target UE;
   receiving a control message indicating whether the data transmission is to be at least partially decoded by the helper UE when the data transmission is intended for the target UE;
   decoding at least part of the data transmission intended for the target UE in response to the control message indicating the data transmission is to be at least partially decoded;
   retransmitting the data transmission to the target UE based at least in part on the field indicating the data transmission is intended for the target UE; and
   performing a hybrid automatic repeat request (HARQ) retransmission of the data transmission to the target UE in accordance with either a semi-persistently scheduled resource allocation of an intended sidelink for the retransmission or a resource allocation received in the control message.

2. The method of claim 1, wherein the data transmission is either a unicast transmission or a multicast transmission via a Group-Radio Radio Network Temporary Identifier (G-RNTI) and wherein the multicast transmission is to a UE group which comprises at least the helper UE, and the target UE.

3. The method of claim 1, further comprising:
   receiving the control message from the network node prior to receiving the data transmission, wherein the control message indicates a UE identifier for the target UE.

4. The method of claim 3, further comprising determining whether the data transmission is for the target UE based in part on a map of a set of UEs, the map capable of uniquely identifies at least the target UE and the helper UE.

5. The method of claim 1, further comprising:
   receiving a trigger message, wherein retransmitting the data transmission comprises transmitting the data transmission to the target UE upon receiving the trigger message.

6. The method of claim 5, wherein the trigger message is received upon the helper UE successfully decoding at least part of the data transmission and upon the helper UE transmitting an indication to the network node that at least part of the data transmission has been successfully decoded.

7. The method of claim 5, wherein the trigger message comprises a modulation and coding scheme (MCS), a precoding matrix indicator (PMI), and a rank indicator (RI) for retransmitting the data transmission.

8. The method of claim 1, wherein the field indicating whether the data transmission is intended for the helper UE is a one-bit field.

9. A method for wireless communications performed by a network node, comprising:
   transmitting a control message to at least a helper user equipment (UE), the control message comprising a downlink control information (DCI) field including a first indicator of whether a data transmission is intended for the helper UE or a target UE, the control message comprising a second indicator for the helper UE to forward the data transmission after decoding at least part of the data transmission, the control message comprising a third indicator for whether the data transmission is to be at least partially decoded by the helper UE;
   transmitting the data transmission to at least the helper UE and the target UE; and
   receiving a hybrid automatic repeat request (HARQ) retransmission of the data transmission to the target UE in accordance with either a semi-persistently scheduled resource allocation of an intended sidelink for the retransmission or a resource allocation received in the control message.

10. The method of claim 9, wherein the data transmission is either a unicast transmission or a multicast transmission via a Group-Radio Network Temporary Identifier (G-RNTI) and wherein the multicast transmission is to a helper UE group of which the helper UE is a member.

11. The method of claim 9, wherein the network node comprise one of a base station or a programmable logical control (PLC) node, and wherein the control message indicates a UE identifier for the target UE when the control message indicates that the data transmission is intended for the target UE.

12. The method of claim 9, further comprising transmitting a trigger message to the helper UE upon failing to receive an ACK from the target UE on the data transmission, wherein the trigger message indicates to the helper UE to re-transmit the data transmission to the target UE using a sidelink.

13. The method of claim 12, wherein the trigger message is sent to the helper UE upon receiving an indication from the helper UE that at least part of the data transmission has been successfully decoded.

14. The method of claim 12, wherein the trigger message comprises a modulation and coding scheme (MCS), a precoding matrix indicator (PMI), and a rank indicator (RI) for retransmitting the data transmission.

15. The method of claim 9, wherein the DCI field is a one-bit field.

16. A helper user equipment (UE) for wireless communications, comprising:
- a transceiver;
- a memory; and
- at least one processor coupled to the memory and configured to
  - receive a data transmission from a network node;
  - receiving a downlink control information (DCI) message including a field indicating whether the data transmission is intended for the helper UE or a target UE;
  - receive a control message indicating whether the data transmission is to be at least partially decoded when the data transmission is intended for the target UE;
  - decode at least part of the data transmission in response to the control message indicating the data transmission is to be at least partially decoded;
  - retransmit the data transmission to the target UE based at least in part on the field indicating the data transmission is intended for the target UE; and
  - perform a hybrid automatic repeat request (HARQ) retransmission of the data transmission to the target UE in accordance with either a semi-persistently scheduled resource allocation of an intended sidelink for the retransmission or a resource allocation received in the control message.

17. The helper UE of claim 16, wherein the data transmission is either a unicast transmission or a multicast transmission via a Group-Radio Radio Network Temporary Identifier (G-RNTI) and wherein the multicast transmission is to a UE group which comprises at least the helper UE, and the target UE.

18. The helper UE of claim 16, wherein the at least one processor is further configured to receive the control message from the network node prior to receiving the data transmission, wherein the control message indicates a UE identifier for the target UE.

19. The helper UE of claim 18, wherein the at least one processor is further configured to determine whether the data transmission is for the target UE based in part on a map of a set of UEs, the map capable of uniquely identifies at least the target UE and the helper UE.

20. The method of claim 16, wherein the field indicating whether the data transmission is intended for the helper UE is a one-bit field.

21. An apparatus for wireless communications at a helper user equipment (UE), comprising:
- means for receiving a data transmission from a network node;
- means for receiving a downlink control information (DCI) message including a field indicating whether the data transmission is intended for the helper UE or a target UE;
- means for receiving a control message indicating whether the data transmission is to be at least partially decoded when the data transmission is intended for the target UE;
- means for decoding at least part of the data transmission in response to the control message indicating the data transmission is to be at least partially decoded;
- means for retransmitting the data transmission to the target UE based at least in part on the field indicating the data transmission is intended for the target UE; and
- means for performing a hybrid automatic repeat request (HARQ) retransmission of the data transmission to the target UE in accordance with either a semi-persistently scheduled resource allocation of an intended sidelink for the retransmission or a resource allocation received in the control message.

22. The apparatus of claim 21, wherein the data transmission is either a unicast transmission or a multicast transmission via a Group-Radio Radio Network Temporary Identifier (G-RNTI) and wherein the multicast transmission is to a UE group which comprises at least the helper UE and the target UE.

23. The apparatus of claim 21, further comprising means for receiving the control message from the network node prior to receiving the data transmission, wherein the control message indicates a UE identifier for the target UE.

24. The apparatus of claim 23, further comprising means for determining whether the data transmission is for the target UE based in part on a map of a set of UEs, the map capable of uniquely identifies at least the target UE and the helper UE.

25. The method of claim 21, wherein the field indicating whether the data transmission is intended for the helper UE is a one-bit field.

* * * * *